United States Patent
Tezcan et al.

(10) Patent No.: US 7,882,280 B2
(45) Date of Patent: *Feb. 1, 2011

(54) PACKET PROCESSING SWITCH AND METHODS OF OPERATION THEREOF

(75) Inventors: Bertan Tezcan, San Jose, CA (US); William Terry Beane, Gustine, CA (US); Scott Darnell, Suwanee, GA (US)

(73) Assignee: Integrated Device Technology, inc., San Jose, CA (US)

( * ) Notice: Subject to any disclaimer, the term of this patent is extended or adjusted under 35 U.S.C. 154(b) by 642 days.

This patent is subject to a terminal disclaimer.

(21) Appl. No.: 11/395,575

(22) Filed: Mar. 31, 2006

(65) Prior Publication Data

US 2006/0248377 A1    Nov. 2, 2006

Related U.S. Application Data

(60) Provisional application No. 60/672,349, filed on Apr. 18, 2005.

(51) Int. Cl.
*G06F 3/00* (2006.01)
*G06F 11/00* (2006.01)

(52) U.S. Cl. ............................. 710/34; 714/4
(58) Field of Classification Search .................... 710/30; 714/4; 370/392
See application file for complete search history.

(56) References Cited

U.S. PATENT DOCUMENTS 4,473,880 A  *  9/1984  Budde et al. ................ 710/112
4,932,028 A      6/1990  Katircioglu et al.
4,987,529 A  *  1/1991  Craft et al. .................. 710/113
4,991,171 A      2/1991  Teraslinna et al.
5,072,363 A    12/1991  Gallagher
5,229,991 A      7/1993  Turner
5,276,684 A  *  1/1994  Pearson ..................... 370/438
5,305,311 A      4/1994  Lyles
5,440,546 A      8/1995  Bianchini, Jr.
5,710,549 A  *  1/1998  Horst et al. ................... 710/40
5,764,927 A      6/1998  Murphy et al.

(Continued)

FOREIGN PATENT DOCUMENTS

WO     WO 02/39667 A2    5/2002

OTHER PUBLICATIONS

RFC: 791, DARPA Internet Program Protocol Specification, Sep. 1981, Information Science Institute.*

(Continued)

*Primary Examiner*—Henry W. H. Tsai
*Assistant Examiner*—Hyun Nam
(74) *Attorney, Agent, or Firm*—Myers, Bigel, et al.

(57) ABSTRACT

A packet switching integrated circuit chip is configured to receive packets, e.g., RapidIO™-compliant packets, from a plurality of external sources, and selectively passes data in the received packets to a plurality of external recipients. The chip is configured to pass first received packets without modification and to terminate second received packets and preprocess payloads thereof to produce new packets. The chip may be configured to perform signal sample processing operations on the second received packets, such as bit extension, bit truncation, bit reordering and/or bit arithmetic operations. The chip may be further configured to manage the first and second received packets based on destination addresses in the received packets.

21 Claims, 26 Drawing Sheets

U.S. PATENT DOCUMENTS

| | | | |
|---|---|---|---|
| 5,999,981 A | 12/1999 | Willenz | |
| 6,044,085 A | 3/2000 | Horlander | |
| 6,098,110 A * | 8/2000 | Witkowski et al. | 709/249 |
| 6,134,229 A * | 10/2000 | Schwaller et al. | 370/336 |
| 6,377,782 B1 | 4/2002 | Bishop et al. | |
| 6,389,479 B1 * | 5/2002 | Boucher et al. | 709/243 |
| 6,598,179 B1 | 7/2003 | Chirashnya et al. | |
| 6,625,121 B1 * | 9/2003 | Lau et al. | 370/230 |
| 6,633,578 B1 * | 10/2003 | Matsumaru et al. | 370/419 |
| 6,647,449 B1 | 11/2003 | Watts | |
| 6,661,788 B2 * | 12/2003 | Angle et al. | 370/390 |
| 6,662,339 B1 | 12/2003 | Laneman et al. | |
| 6,675,325 B1 | 1/2004 | Garney et al. | |
| 6,678,279 B1 | 1/2004 | Meredith | |
| 6,804,237 B1 | 10/2004 | Luo | |
| 6,882,649 B1 | 4/2005 | Gura et al. | |
| 6,937,133 B2 | 8/2005 | Johnson et al. | |
| 6,954,463 B1 * | 10/2005 | Ma et al. | 370/401 |
| 6,954,811 B2 | 10/2005 | Vishnu | |
| 6,954,812 B2 | 10/2005 | Lavigne | |
| 6,963,576 B1 | 11/2005 | Lee | |
| 6,975,651 B1 * | 12/2005 | Ono et al. | 370/474 |
| 6,988,177 B2 | 1/2006 | Sokol | |
| 7,006,501 B1 | 2/2006 | Gura et al. | |
| 7,020,161 B1 * | 3/2006 | Eberle et al. | 370/468 |
| 7,023,840 B2 * | 4/2006 | Golla et al. | 370/360 |
| 7,027,443 B2 | 4/2006 | Nichols | |
| 7,058,789 B2 * | 6/2006 | Henderson et al. | 711/220 |
| 7,106,742 B1 | 9/2006 | Frisch et al. | |
| 7,224,671 B2 * | 5/2007 | Lee et al. | 370/235 |
| 7,260,120 B2 * | 8/2007 | Kang et al. | 370/535 |
| 7,274,705 B2 | 9/2007 | Chang et al. | |
| 2001/0014105 A1 * | 8/2001 | Tezuka et al. | 370/474 |
| 2001/0020266 A1 * | 9/2001 | Kojima et al. | 712/225 |
| 2002/0085550 A1 * | 7/2002 | Rhodes | 370/389 |
| 2002/0141256 A1 * | 10/2002 | Barri et al. | 365/200 |
| 2003/0110206 A1 * | 6/2003 | Osokine | 709/201 |
| 2003/0147394 A1 | 8/2003 | Jennings et al. | |
| 2004/0114587 A1 | 6/2004 | Huang et al. | |
| 2004/0153835 A1 * | 8/2004 | Song et al. | 714/38 |
| 2004/0179535 A1 | 9/2004 | Bertagna | |
| 2004/0184466 A1 | 9/2004 | Chang et al. | |
| 2004/0258086 A1 | 12/2004 | Kurupati | |
| 2005/0058127 A1 * | 3/2005 | Munter et al. | 370/380 |
| 2005/0111434 A1 * | 5/2005 | Halen | 370/351 |
| 2005/0138055 A1 | 6/2005 | Handlogten et al. | |
| 2005/0232201 A1 * | 10/2005 | Bysted et al. | 370/332 |
| 2005/0249244 A1 * | 11/2005 | McNamara et al. | 370/474 |
| 2006/0007885 A1 * | 1/2006 | Pollack et al. | 370/328 |
| 2006/0039374 A1 | 2/2006 | Belz et al. | |
| 2006/0050738 A1 * | 3/2006 | Carr et al. | 370/474 |
| 2006/0075311 A1 | 4/2006 | Ranjan et al. | |
| 2006/0128436 A1 * | 6/2006 | Doi et al. | 455/562.1 |
| 2006/0248377 A1 * | 11/2006 | Tezcan et al. | 714/4 |
| 2006/0251069 A1 * | 11/2006 | Cathey et al. | 370/389 |
| 2007/0072646 A1 * | 3/2007 | Kuwahara et al. | 455/561 |
| 2007/0124554 A1 * | 5/2007 | Allen et al. | 711/163 |
| 2008/0151922 A1 | 6/2008 | Elzur et al. | |
| 2008/0219235 A1 * | 9/2008 | Ma et al. | 370/344 |
| 2008/0228871 A1 | 9/2008 | Sano | |
| 2008/0275872 A1 | 11/2008 | Venkatachary et al. | |
| 2008/0298492 A1 * | 12/2008 | Hwang et al. | 375/260 |

OTHER PUBLICATIONS 802.11 standard, Aug. 21, 2002, http://wlan.nat.sdu.dk/802_11standard.htm.*

History of the I2C Bus, Circa 2000, ESAcademy.*

International Search Report, PCT/US2006/013767, Jul. 31, 2006.

"Solano Communications IC: A High-Throughput Solution for 3G Wireless and Broadband Base Stations," Spectrum Wireless Systems, Admitted Prior Art, 4 pages.

"Tsi568A: Serial RapidIO Switch," Tundra Semiconductor Corp., Printed From Internet Feb. 17, 2005, 4 pages.

"RapdilO: An Embedded System Component Network Architecture," Architecture and Systems Platforms, Motorola Semiconductor Product Sector, Feb. 22, 2000, 25 pages.

"Cisco MDS 9020 Fabric Switch Configuration Guide and Command Reference, Release 2.x," pp. 10-1 through 10-4, Cisco Systems, Inc., Jun. 2005.

"RapidIO Interconnect Specification, Part 8, Error Management, Extensions Specification," RapidIO Trade Association, Jun. 2005.

802.11 Standard, Aug. 21, 2002, http://wlan.nat.sdu.dk/802_11standard.htm.

Sekanina et al., "Theory and Applications of Evolvable Embedded Systems," Proceedings of the 11$^{th}$ IEEE International Conference and Workshop on the Engineering of Computer-Based Systems (ECBS'04), 2004.

Tezcan et al., "Achieving modular wireless infrastructure design: A compelling look at benefits supporting connectivity amongst DSPs, FPGAs, or ASICs," OpenSystems Publishing, Sep. 22, 2006, available at http://www.dsp-fpga.com/articles/tezcan_and_beane.

Tezcan et al., "How to achieve low-cost, reusable wireless infrastructure through modular baseband design," Wireless Net DesignLine, Aug. 8, 2006, available at http://www.wirelessnetdesignline.com.

Tezcan et al., "Modular baseband design—Enabling a low-cost reusable wireless infrastructure (Part I)," Portable Design Online Article, Feb. 15, 2007, previously available at http://pd.pennnet.com.

Tezcan et al., "Modular baseband design—Enabling a low-cost reusable wireless infrastructure (Part II)," Portable Design Online Article, Feb. 15, 2007, previously available at http://pd.pennnet.com.

Welcher, Peter, "Configuring SNMP on Switches, and Syslog," Jun. 24, 1999.

* cited by examiner

| Link | x4 Port Number | x1 Port Number |
|---|---|---|
| 0 | 0 | 0 |
| 1 | | |
| 2 | | |
| 3 | | |
| 4 | 1 | 1 |
| 5 | | 2 |
| 6 | | 3 |
| 7 | | 4 |
| 8 | 2 | 5 |
| 9 | | |
| 10 | | |
| 11 | | |
| 12 | 3 | 6 |
| 13 | | 7 |
| 14 | | 8 |
| 15 | | 9 |
| 16 | 4 | 10 |
| 17 | | 11 |
| 18 | | |
| 19 | | |
| 20 | 5 | 12 |
| 21 | | 13 |
| 22 | | |
| 23 | | |
| 24 | 6 | 14 |
| 25 | | 15 |
| 26 | | 16 |
| 27 | | 17 |
| 28 | 7 | 18 |
| 29 | | |
| 30 | | |
| 31 | | |
| 32 | 8 | 19 |
| 33 | | 20 |
| 34 | | 21 |
| 35 | | 22 |
| 36 | 9 | 23 |
| 37 | | |
| 38 | | |
| 39 | | |

FIG. 3

| Link | x4 Port Number | x1 Port Number |
| --- | --- | --- |
| 0 | 0 | 1.25Hb/s |
| 1 | | |
| 2 | | |
| 3 | | |
| 4 | 1 | 1.25Gb/s |
| 5 | 2 | 1.25Gb/s |
| 6 | 3 | 1.25Gb/s |
| 7 | 4 | 1.25Gb/s |
| 8 | 5 | 1.25Gb/s |
| 9 | | |
| 10 | | |
| 11 | | |
| 12 | 6 | 1.25Gb/s |
| 13 | | |
| 14 | | |
| 15 | | |
| 16 | 7 | 1.25Gb/s |
| 17 | | |
| 18 | | |
| 19 | | |
| 20 | 8 | 1.25Gb/s |
| 21 | | |
| 22 | | |
| 23 | | |
| 24 | 9 | 1.25Gb/s |
| 25 | | |
| 26 | | |
| 27 | | |
| 28 | 10 | 1.25Gb/s |
| 29 | | |
| 30 | | |
| 31 | | |
| 32 | 11 | 1.25Gb/s |
| 33 | | |
| 34 | | |
| 35 | | |
| 36 | 12 | 1.25Gb/s |
| 37 | | |
| 38 | | |
| 39 | | |

FIG. 4

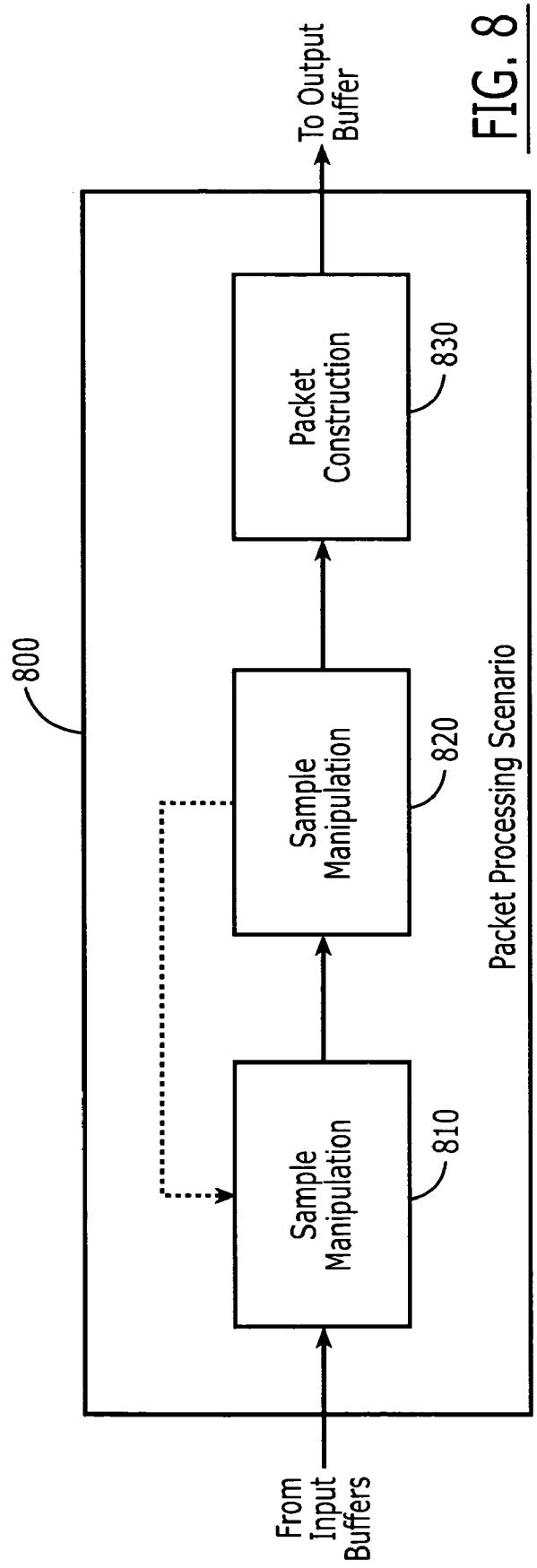

| User Field | $A_{111}\ A_{11(K+1)}\ \ldots\ A_{11N}\ A_{121}\ A_{12(K+1)}\ \ldots\ A_{1MN}\ A_{211}\ A_{21(K+1)}\ \ldots\ A_{RM1}\ A_{RM(K+1)}\ \ldots A_{RMN}$ |

| User Field | $B_{111}\ B_{11(K+1)}\ \ldots\ B_{11N}\ B_{121}\ B_{12(K+1)}\ \ldots\ B_{1MN}\ B_{211}\ B_{21(K+1)}\ \ldots\ B_{RM1}\ B_{RM(K+1)}\ \ldots B_{RMN}$ |

• • •

| User Field | $X_{111}\ X_{11(K+1)}\ \ldots\ X_{11N}\ X_{121}\ X_{12(K+1)}\ \ldots\ X_{1MN}\ X_{211}\ X_{21(K+1)}\ \ldots\ X_{RM1}\ X_{RM(K+1)}\ \ldots X_{RMN}$ |

FIG. 9

| User Field | $A_{111}\ A_{11(K+1)}\ \ldots\ A_{11N}\ A_{121}\ A_{12(K+1)}\ \ldots\ A_{1MN}\ A_{211}\ A_{21(K+1)}\ \ldots\ A_{RM1}\ A_{RM(K+1)}\ \ldots A_{RMN}$ |

$\underbrace{I_0\ I_1\ \ldots\ I_{B-1}}_{\text{I sub-sample}}\ \underbrace{Q_0\ Q_1\ \ldots\ Q_{B-1}}_{\text{Q sub-sample}}$

FIG. 10

| Source RF Card 1 |
|---|
| RIO Header w/PPSc Scenario X |
| (Ant A, 1st Sample I) |
| (Ant A, 1st Sample Q) |
| (Ant A, 2nd Sample I) |
| (Ant A, 2nd Sample Q) |
| (Ant B, 1st Sample I) |
| (Ant B, 1st Sample Q) |
| (Ant B, 2nd Sample I) |
| (Ant B, 2nd Sample Q) |
| (Ant A, 3rd Sample I) |
| (Ant A, 3rd Sample Q) |
| (Ant A, 4th Sample I) |
| (Ant A, 4th Sample Q) |
| (Ant B, 3rd Sample I) |
| (Ant B, 3rd Sample Q) |
| (Ant B, 4th Sample I) |
| (Ant B, 4th Sample Q) |

| Source RF Card 2 |
|---|
| RIO Header w/PPSc Scenario X |
| (Ant A, 1st Sample I) |
| (Ant A, 1st Sample Q) |
| (Ant A, 2nd Sample I) |
| (Ant A, 2nd Sample Q) |
| (Ant B, 1st Sample I) |
| (Ant B, 1st Sample Q) |
| (Ant B, 2nd Sample I) |
| (Ant B, 2nd Sample Q) |
| (Ant A, 3rd Sample I) |
| (Ant A, 3rd Sample Q) |
| (Ant A, 4th Sample I) |
| (Ant A, 4th Sample Q) |
| (Ant B, 3rd Sample I) |
| (Ant B, 3rd Sample Q) |
| (Ant B, 4th Sample I) |
| (Ant B, 4th Sample Q) |

| Source RF Card 3 |
|---|
| RIO Header w/PPSc Scenario X |
| (Ant A, 1st Sample I) |
| (Ant A, 1st Sample Q) |
| (Ant A, 2nd Sample I) |
| (Ant A, 2nd Sample Q) |
| (Ant B, 1st Sample I) |
| (Ant B, 1st Sample Q) |
| (Ant B, 2nd Sample I) |
| (Ant B, 2nd Sample Q) |
| (Ant A, 3rd Sample I) |
| (Ant A, 3rd Sample Q) |
| (Ant A, 4th Sample I) |
| (Ant A, 4th Sample Q) |
| (Ant B, 3rd Sample I) |
| (Ant B, 3rd Sample Q) |
| (Ant B, 4th Sample I) |
| (Ant B, 4th Sample Q) |

| Source RF Card 4 |
|---|
| RIO Header w/PPSc Scenario X |
| (Ant A, 1st Sample I) |
| (Ant A, 1st Sample Q) |
| (Ant A, 2nd Sample I) |
| (Ant A, 2nd Sample Q) |
| (Ant B, 1st Sample I) |
| (Ant B, 1st Sample Q) |
| (Ant B, 2nd Sample I) |
| (Ant B, 2nd Sample Q) |
| (Ant A, 3rd Sample I) |
| (Ant A, 3rd Sample Q) |
| (Ant A, 4th Sample I) |
| (Ant A, 4th Sample Q) |
| (Ant B, 3rd Sample I) |
| (Ant B, 3rd Sample Q) |
| (Ant B, 4th Sample I) |
| (Ant B, 4th Sample Q) |

FIG. 15

| Queue 0 (Port 0-Carrier 1) | Queue 1 (Port 0-Carrier 2) |
|---|---|
| (Ant A, 1st Sample I) | (Ant B, 1st Sample I) |
| (Ant A, 1st Sample Q) | (Ant B, 1st Sample Q) |
| (Ant A, 2nd Sample I) | (Ant B, 2nd Sample I) |
| (Ant A, 2nd Sample Q) | (Ant B, 2nd Sample Q) |
| (Ant A, 3rd Sample I) | (Ant B, 3rd Sample I) |
| (Ant A, 3rd Sample Q) | (Ant B, 3rd Sample Q) |
| (Ant A, 4th Sample I) | (Ant B, 4th Sample I) |
| (Ant A, 4th Sample Q) | (Ant B, 4th Sample Q) |

| Queue 2 (Port 1-Carrier 1) | Queue 3 (Port 1-Carrier 2) |
|---|---|
| (Ant A, 1st Sample I) | (Ant B, 1st Sample I) |
| (Ant A, 1st Sample Q) | (Ant B, 1st Sample Q) |
| (Ant A, 2nd Sample I) | (Ant B, 2nd Sample I) |
| (Ant A, 2nd Sample Q) | (Ant B, 2nd Sample Q) |
| (Ant A, 3rd Sample I) | (Ant B, 3rd Sample I) |
| (Ant A, 3rd Sample Q) | (Ant B, 3rd Sample Q) |
| (Ant A, 4th Sample I) | (Ant B, 4th Sample I) |
| (Ant A, 4th Sample Q) | (Ant B, 4th Sample Q) |

| Queue 4 (Port 2-Carrier 1) | Queue 5 (Port 2-Carrier 2) |
|---|---|
| (Ant A, 1st Sample I) | (Ant B, 1st Sample I) |
| (Ant A, 1st Sample Q) | (Ant B, 1st Sample Q) |
| (Ant A, 2nd Sample I) | (Ant B, 2nd Sample I) |
| (Ant A, 2nd Sample Q) | (Ant B, 2nd Sample Q) |
| (Ant A, 3rd Sample I) | (Ant B, 3rd Sample I) |
| (Ant A, 3rd Sample Q) | (Ant B, 3rd Sample Q) |
| (Ant A, 4th Sample I) | (Ant B, 4th Sample I) |
| (Ant A, 4th Sample Q) | (Ant B, 4th Sample Q) |

| Queue 6 (Port 3-Carrier 1) | Queue 7 (Port32-Carrier 2) |
|---|---|
| (Ant A, 1st Sample I) | (Ant B, 1st Sample I) |
| (Ant A, 1st Sample Q) | (Ant B, 1st Sample Q) |
| (Ant A, 2nd Sample I) | (Ant B, 2nd Sample I) |
| (Ant A, 2nd Sample Q) | (Ant B, 2nd Sample Q) |
| (Ant A, 3rd Sample I) | (Ant B, 3rd Sample I) |
| (Ant A, 3rd Sample Q) | (Ant B, 3rd Sample Q) |
| (Ant A, 4th Sample I) | (Ant B, 4th Sample I) |
| (Ant A, 4th Sample Q) | (Ant B, 4th Sample Q) |

FIG. 16

Output Port 20,22,23

| RIO Header w/PPSc Scenario X | Packet Cont'd |
|---|---|
| (Ant A, 1st Sample I) | (Ant A, 1st Sample I) |
| (Ant A, 1st Sample Q) | (Ant A, 1st Sample Q) |
| (Ant A, 3rd Sample I) | (Ant A, 3rd Sample I) |
| (Ant A, 3rd Sample Q) | (Ant A, 3rd Sample Q) |
| (Ant A, 2nd Sample I) | (Ant A, 2nd Sample I) |
| (Ant A, 2nd Sample Q) | (Ant A, 2nd Sample Q) |
| (Ant A, 4th Sample I) | (Ant A, 4th Sample I) |
| (Ant A, 4th Sample Q) | (Ant A, 4th Sample Q) |
| (Ant B, 1st Sample I) | (Ant B, 1st Sample I) |
| (Ant B, 1st Sample Q) | (Ant B, 1st Sample Q) |
| (Ant B, 3rd Sample I) | (Ant B, 3rd Sample I) |
| (Ant B, 3rd Sample Q) | (Ant B, 3rd Sample Q) |
| (Ant B, 2nd Sample I) | (Ant B, 2nd Sample I) |
| (Ant B, 2nd Sample Q) | (Ant B, 2nd Sample Q) |
| (Ant B, 4th Sample I) | (Ant B, 4th Sample I) |
| (Ant B, 4th Sample Q) | (Ant B, 4th Sample Q) |
| (Ant A, 1st Sample I) | (Ant A, 1st Sample I) |
| (Ant A, 1st Sample Q) | (Ant A, 1st Sample Q) |
| (Ant A, 3rd Sample I) | (Ant A, 3rd Sample I) |
| (Ant A, 3rd Sample Q) | (Ant A, 3rd Sample Q) |
| (Ant A, 2nd Sample I) | (Ant A, 2nd Sample I) |
| (Ant A, 2nd Sample Q) | (Ant A, 2nd Sample Q) |
| (Ant A, 4th Sample I) | (Ant A, 4th Sample I) |
| (Ant A, 4th Sample Q) | (Ant A, 4th Sample Q) |
| (Ant B, 1st Sample I) | (Ant B, 1st Sample I) |
| (Ant B, 1st Sample Q) | (Ant B, 1st Sample Q) |
| (Ant B, 3rd Sample I) | (Ant B, 3rd Sample I) |
| (Ant B, 3rd Sample Q) | (Ant B, 3rd Sample Q) |
| (Ant B, 2nd Sample I) | (Ant B, 2nd Sample I) |
| (Ant B, 2nd Sample Q) | (Ant B, 2nd Sample Q) |
| (Ant B, 4th Sample I) | (Ant B, 4th Sample I) |
| (Ant B, 4th Sample Q) | (Ant B, 4th Sample Q) |

FIG. 17

Output Port 20,22,23

| | |
|---|---|
| RIO Header w/PPSc Scenario X | RIO Header w/PPSc Scenario X |
| (Ant A, 1st Sample I) | (Ant A, 1st Sample I) |
| (Ant A, 1st Sample Q) | (Ant A, 1st Sample Q) |
| (Ant A, 3rd Sample I) | (Ant A, 3rd Sample I) |
| (Ant A, 3rd Sample Q) | (Ant A, 3rd Sample Q) |
| RIO Header w/PPSc Scenario X | RIO Header w/PPSc Scenario X |
| (Ant A, 2nd Sample I) | (Ant A, 2nd Sample I) |
| (Ant A, 2nd Sample Q) | (Ant A, 2nd Sample Q) |
| (Ant A, 4th Sample I) | (Ant A, 4th Sample I) |
| (Ant A, 4th Sample Q) | (Ant A, 4th Sample Q) |
| RIO Header w/PPSc Scenario X | RIO Header w/PPSc Scenario X |
| (Ant B, 1st Sample I) | (Ant B, 1st Sample I) |
| (Ant B, 1st Sample Q) | (Ant B, 1st Sample Q) |
| (Ant B, 3rd Sample I) | (Ant B, 3rd Sample I) |
| (Ant B, 3rd Sample Q) | (Ant B, 3rd Sample Q) |
| RIO Header w/PPSc Scenario X | RIO Header w/PPSc Scenario X |
| (Ant B, 2nd Sample I) | (Ant B, 2nd Sample I) |
| (Ant B, 2nd Sample Q) | (Ant B, 2nd Sample Q) |
| (Ant B, 4th Sample I) | (Ant B, 4th Sample I) |
| (Ant B, 4th Sample Q) | (Ant B, 4th Sample Q) |
| RIO Header w/PPSc Scenario X | RIO Header w/PPSc Scenario X |
| (Ant A, 1st Sample I) | (Ant A, 1st Sample I) |
| (Ant A, 1st Sample Q) | (Ant A, 1st Sample Q) |
| (Ant A, 3rd Sample I) | (Ant A, 3rd Sample I) |
| (Ant A, 3rd Sample Q) | (Ant A, 3rd Sample Q) |
| RIO Header w/PPSc Scenario X | RIO Header w/PPSc Scenario X |
| (Ant A, 2nd Sample I) | (Ant A, 2nd Sample I) |
| (Ant A, 2nd Sample Q) | (Ant A, 2nd Sample Q) |
| (Ant A, 4th Sample I) | (Ant A, 4th Sample I) |
| (Ant A, 4th Sample Q) | (Ant A, 4th Sample Q) |
| RIO Header w/PPSc Scenario X | RIO Header w/PPSc Scenario X |
| (Ant B, 1st Sample I) | (Ant B, 1st Sample I) |
| (Ant B, 1st Sample Q) | (Ant B, 1st Sample Q) |
| (Ant B, 3rd Sample I) | (Ant B, 3rd Sample I) |
| (Ant B, 3rd Sample Q) | (Ant B, 3rd Sample Q) |
| RIO Header w/PPSc Scenario X | RIO Header w/PPSc Scenario X |
| (Ant B, 2nd Sample I) | (Ant B, 2nd Sample I) |
| (Ant B, 2nd Sample Q) | (Ant B, 2nd Sample Q) |
| (Ant B, 4th Sample I) | (Ant B, 4th Sample I) |
| (Ant B, 4th Sample Q) | (Ant B, 4th Sample Q) |

FIG. 18

| Output Port 20,22 | Output Port 23 |
|---|---|
| RIO Header w/PPSc Scenario X | RIO Header w/PPSc Scenario X |
| (Ant A, 1st Sample I) | (Ant B, 1st Sample I) |
| (Ant A, 1st Sample Q) | (Ant B, 1st Sample Q) |
| (Ant A, 3rd Sample I) | (Ant B, 2nd Sample I) |
| (Ant A, 3rd Sample Q) | (Ant B, 2nd Sample Q) |
| (Ant A, 2nd Sample I) | (Ant B, 1st Sample I) |
| (Ant A, 2nd Sample Q) | (Ant B, 1st Sample Q) |
| (Ant A, 4th Sample I) | (Ant B, 2nd Sample I) |
| (Ant A, 4th Sample Q) | (Ant B, 2nd Sample Q) |
| (Ant A, 1st Sample I) | (Ant B, 1st Sample I) |
| (Ant A, 1st Sample Q) | (Ant B, 1st Sample Q) |
| (Ant A, 3rd Sample I) | (Ant B, 2nd Sample I) |
| (Ant A, 3rd Sample Q) | (Ant B, 2nd Sample Q) |
| (Ant A, 2nd Sample I) | (Ant B, 1st Sample I) |
| (Ant A, 2nd Sample Q) | (Ant B, 1st Sample Q) |
| (Ant A, 4th Sample I) | (Ant B, 2nd Sample I) |
| (Ant A, 4th Sample Q) | (Ant B, 2nd Sample Q) |
| (Ant A, 1st Sample I) | (Ant B, 3rd Sample I) |
| (Ant A, 1st Sample Q) | (Ant B, 3rd Sample Q) |
| (Ant A, 3rd Sample I) | (Ant B, 4th Sample I) |
| (Ant A, 3rd Sample Q) | (Ant B, 4th Sample Q) |
| (Ant A, 2nd Sample I) | (Ant B, 3rd Sample I) |
| (Ant A, 2nd Sample Q) | (Ant B, 3rd Sample Q) |
| (Ant A, 4th Sample I) | (Ant B, 4th Sample I) |
| (Ant A, 4th Sample Q) | (Ant B, 4th Sample Q) |
| (Ant A, 1st Sample I) | (Ant B, 3rd Sample I) |
| (Ant A, 1st Sample Q) | (Ant B, 3rd Sample Q) |
| (Ant A, 3rd Sample I) | (Ant B, 4th Sample I) |
| (Ant A, 3rd Sample Q) | (Ant B, 4th Sample Q) |
| (Ant A, 2nd Sample I) | (Ant B, 3rd Sample I) |
| (Ant A, 2nd Sample Q) | (Ant B, 3rd Sample Q) |
| (Ant A, 4th Sample I) | (Ant B, 4th Sample I) |
| (Ant A, 4th Sample Q) | (Ant B, 4th Sample Q) |

FIG. 19

Queue 0 (Sum of Port 0,1,2,3)

| |
|---|
| (Ant A, 1st Sample I) Sum of Queue 0,2,4, 6 |
| (Ant A, 1st Sample Q) Sum of Queue 0,2,4, 6 |
| (Ant A, 2nd Sample I) Sum of Queue 0,2,4, 6 |
| (Ant A, 2nd Sample Q) Sum of Queue 0,2,4, 6 |
| (Ant A, 3rd Sample I) Sum of Queue 0,2,4, 6 |
| (Ant A, 3rd Sample Q) Sum of Queue 0,2,4, 6 |
| (Ant A, 4th Sample I) Sum of Queue 0,2,4, 6 |
| (Ant A, 4th Sample Q) Sum of Queue 0,2,4, 6 |

Queue 1 (Sum of Port 0,1,2,3)

| |
|---|
| (Ant A, 1st Sample I) Sum of Queue 1,3,5,7 |
| (Ant A, 1st Sample Q) Sum of Queue 1,3,5,7 |
| (Ant A, 2nd Sample I) Sum of Queue 1,3,5,7 |
| (Ant A, 2nd Sample Q) Sum of Queue 1,3,5,7 |
| (Ant A, 3rd Sample I) Sum of Queue 1,3,5,7 |
| (Ant A, 3rd Sample Q) Sum of Queue 1,3,5,7 |
| (Ant A, 4th Sample I) Sum of Queue 1,3,5,7 |
| (Ant A, 4th Sample Q) Sum of Queue 1,3,5,7 |

PACKET PROCESSING SWITCH AND METHODS OF OPERATION THEREOF

CROSS-REFERENCE TO RELATED APPLICATION

The present application claims the benefit of U.S. Provisional Application Ser. No. 60/672,349, filed Apr. 18, 2005, the disclosure of which is hereby incorporated by reference herein in its entirety.

BACKGROUND OF THE INVENTION

This invention relates to packet communications devices and methods and, more particularly, to packet switching devices and methods.

Increasing demand for communications services have generally increased bandwidth requirements for network components. For example, the increased volume of wireless communications has been generally accompanied by an increase in the bandwidth requirements between wireless terminals and base stations. Users demanding more information and more services from their cell phones and other wireless devices can overwhelm available bandwidth. Wireless service providers are migrating to 2.5G and 3G technologies to mitigate this problem. These technologies generally enable more data per broadcast band than 2G technologies, which can be used to give more bandwidth to individual users or to serve more users in the same cell area.

An important aspect of 3G wireless communications systems is closed loop power control. For example, in wideband code division multiple access (WCDMA) systems, it is typically desirable that a base station be capable of telling a mobile terminal to adjust its transmission power within 5 milliseconds after receiving a packet from the terminal. This can be the most constraining limitation on total delay in the base station, as it includes the round-trip delay of received radio signal sample going from an RF card, to a baseband card, and on to a control card, and back to the baseband card, RF card, and antenna. Each base station may have several RF and baseband cards, and signal samples may be transferred between any given RF card and any given baseband card. Reducing latency in transferring data between these cards tends to be important.

Different architectures may be used to convey data between such cards. In a full-mesh architecture, each RF card is connected to each baseband card. A switched architecture provides a multiple-input multiple-output switch between the RF and baseband cards. The switched architecture can provide improved scalability and flexibility, but may add more latency than the full-mesh solution. Also, for smaller systems, a full-mesh architecture may be less expensive than a switched architecture.

Integrated circuits (ICs) have been developed that can support communications between base station components, such as RF cards and baseband cards. For example, Spectrum Signal Processing Inc. offers the ASIC-based Solano™ chip that can be used to interface processors, such as digital signal processors (DSPs), RISC processors, and FPGAs, and sources of data, such as RF cards. The chip includes eight high-speed FIFOs, with associated control logic, that are paired to form four full-duplex channels. Tundra Semiconductor Corporation offers Serial RapidIO® chips that include a switching fabric that can be used to provide a switched architecture between RF and baseband cards.

SUMMARY OF THE INVENTION

In some embodiments of the present invention, a packet switching integrated circuit chip is configured to receive packets, e.g., RapidIO™-compliant packets, from a plurality of external sources, and to selectively pass data in the received packets to a plurality of external recipients. The chip is further configured to pass first received packets without payload modification and to terminate second received packets and preprocess payloads therein to produce new packets. In some embodiments, the chip may be configured to perform signal sample processing operations on the second received packets, such as bit extension, bit truncation, bit reordering and/or bit arithmetic operations. The chip may also be configured to manage the first and second received packets based on destination addresses in the received packets.

In additional embodiments of the present invention, a packet switching integrated circuit chip includes a plurality of input ports configured to receive packets from respective external sources and a plurality of output ports configured to transmit packets to respective external recipients. The chip also includes a packet switching fabric configured to route selected packets from the input ports to selected ones of the output ports, along with a packet processor configured to receive selected packets from the input ports, to construct new packets with new payloads therefrom, and to route the new packets to selected ones of the output ports. The packet processor and the switching fabric may be configured to receive packets from the input ports based on destination addresses therein.

The packet processor may support a plurality of packet processing scenarios. The plurality of packet processing scenarios may include individual packet processing scenarios and group packet processing scenarios that invoke concurrent processing by selected ones of the individual packet processing scenarios. Timing of each packet processing scenario may be controlled responsive to received packet accumulation for the packet processing scenario. Packet accumulation for a packet processing scenario may be controlled responsive to an initialization signal. The packet processing scenarios may be user-configurable, for example, by writing to configuration registers of the chip.

The packet switching fabric and/or the packet processor may be configured to route packets according to priority identifiers therein. In some embodiments, the packet switching fabric includes a plurality of sets of input buffers, respective ones of the sets of input buffers configured to receive and store packets from respective ones of the input ports according to priority identifiers in the packets. The packet processor also includes a plurality of sets of output buffers configured to receive and forward packets to respective ones of the output ports, and a switch configured to transfer packets from the input buffers to the output buffers based on destination addresses thereof and according to priority designations of the input buffers. The priority designations of the input buffers may be user configurable.

In additional embodiments of the present invention, the packet processor, the packet switching fabric, the input ports and/or the output ports are configurable via at least one of the input ports. The chip may further include an inter-integrated circuit ($I^2C$) bus interface, and the packet processor, the packet switching fabric, the input ports and/or the output ports may be configurable via the $I^2C$ bus interface.

Additional embodiments of the present invention provide an interface circuit for interfacing a first plurality of circuit cards to a second plurality of circuit cards. The interface circuit includes a plurality of input ports configured to receive packets from respective ones of the first plurality of circuit cards and a plurality of output ports configured to transmit packets to respective ones of the second plurality of circuit cards. The interface circuit also includes a packet switching fabric configured to route selected packets from the input ports to selected ones of the output ports and a packet processor configured to receive selected packets from the input ports, to construct new packets with new payloads therefrom, and to route the new packets to selected ones of the output ports. The packet processor may be configurable to perform signal sample processing operations on received packets. The signal sample processing operations may include bit extension, bit truncation, bit reordering and/or arithmetic operations. The interface circuit may be configured, for example, to provide routing and processing of radio signal sample packets in a wireless base station or other communications apparatus.

BRIEF DESCRIPTION OF THE DRAWINGS

FIGS. 3 and 4 illustrate exemplary port configurations for a packet processing switch according to some embodiments of the present invention.

FIG. 8 illustrates an exemplary packet processing scenario structure according to some embodiments of the present invention.

FIGS. 9 and 10 illustrate exemplary packet payload formats that may be used with some embodiments of the present invention.

FIG. 15 illustrates exemplary packet structures for source cards of the application illustrated in FIG. 14.

FIG. 16 illustrates exemplary sample queues formed from the packets illustrated in FIG. 15.

FIGS. 17-20 illustrate exemplary output packets produced from the packets of FIG. 15 by various packet processing scenarios according to various embodiments of the present invention.

FIGS. 22 and 23 illustrate exemplary packet processing initialization operations according to further embodiments of the present invention.

DETAILED DESCRIPTION OF EXEMPLARY EMBODIMENTS

Figure 1:
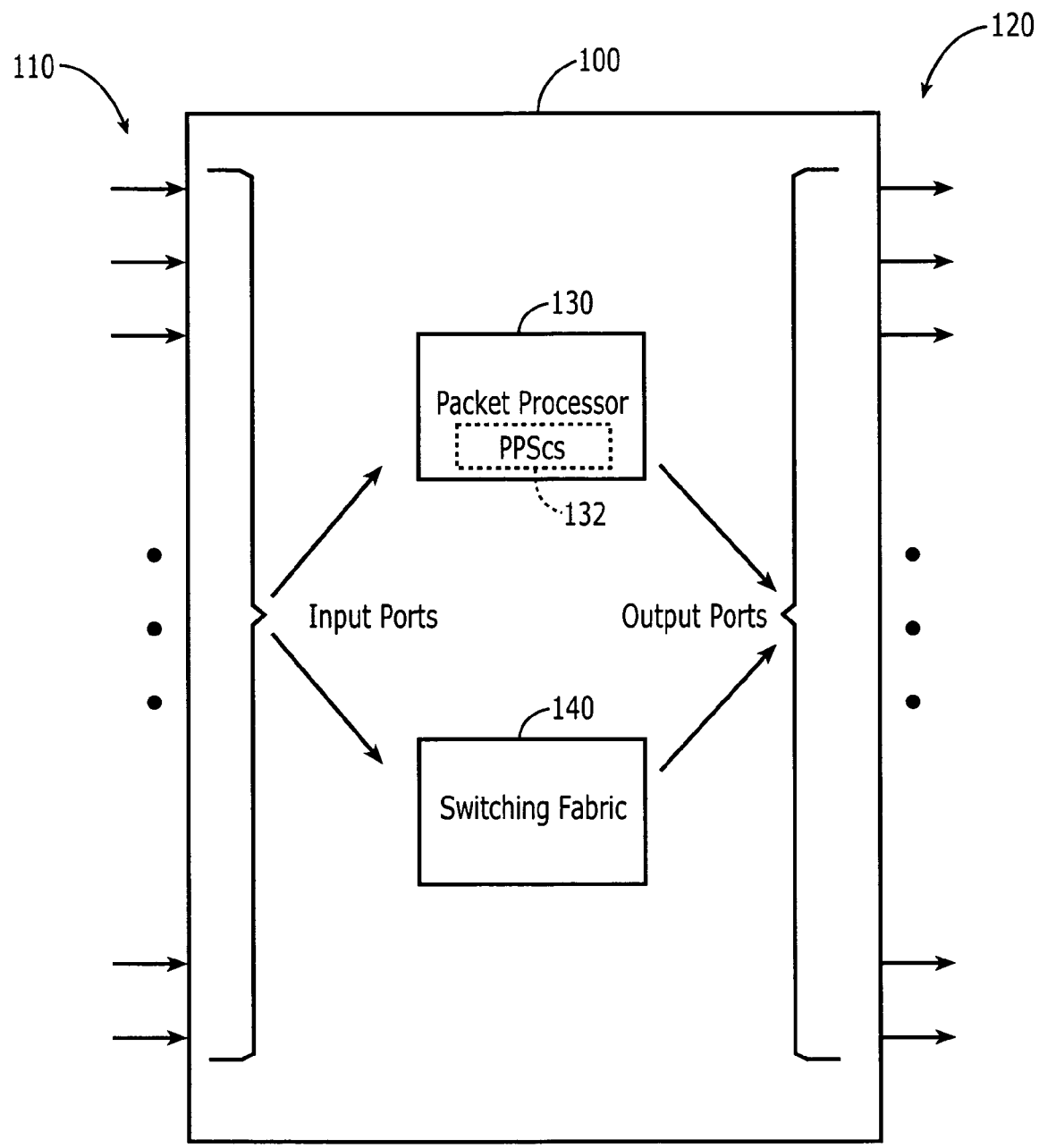
FIG. 1 is a schematic diagram illustrating a packet processing switch integrated circuit chip according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a packet-processing switch integrated circuit (IC) chip 100 according to some embodiments of the present invention. The chip 100 includes input ports 110 that are configured to receive data packets. Packets received at the input ports 110 are selectively routed to a packet processor 130 or a switching fabric 140. The switching fabric 140 provides for routing of the received packets to output ports 120 of the chip 100 without payload modification.

The packet processor 130 synthesizes new packets with new payloads from selected packets received at the input ports 110 according to selected packet processing scenarios (PPScs) 132, with the synthesized packets being transmitted to external recipient devices via the output ports 120. As explained in detail below, the packet processing scenarios 132 may include various payload manipulations, such as bit extension, bit truncation, bit reordering (e.g., interleaving and/or flipping), and combining (e.g., summing or other arithmetic operations) of payloads from multiple received packets. Thus, for example, when used in a signal sample processing application such as in a wireless base station, the chip 100 can relieve the external recipient, e.g., a digital signal processor (DSP) or chip rate processor (CRP), of the burden of reformatting a received signal sample stream for downstream operations, such as baseband processing. In addition, the packet processing scenarios 132 may be user-configurable, allowing the chip to be used for a variety of different communications protocols and/or messaging formats.

In various embodiments of the present described herein, a packet processing chip, such as the chip 100 illustrated in FIG. 1, may be configured to provide packet communications compliant with the RapidIO™ interconnect architecture, which includes physical and logical communications specifications for inter-device communications, as generally described at www.rapidio.org. It will be appreciated however, that although the exemplary embodiments described herein relate to RapidIO™-compliant packet processing switch chips and operations thereof, the present invention may use other packet communication architectures.

Figure 2:
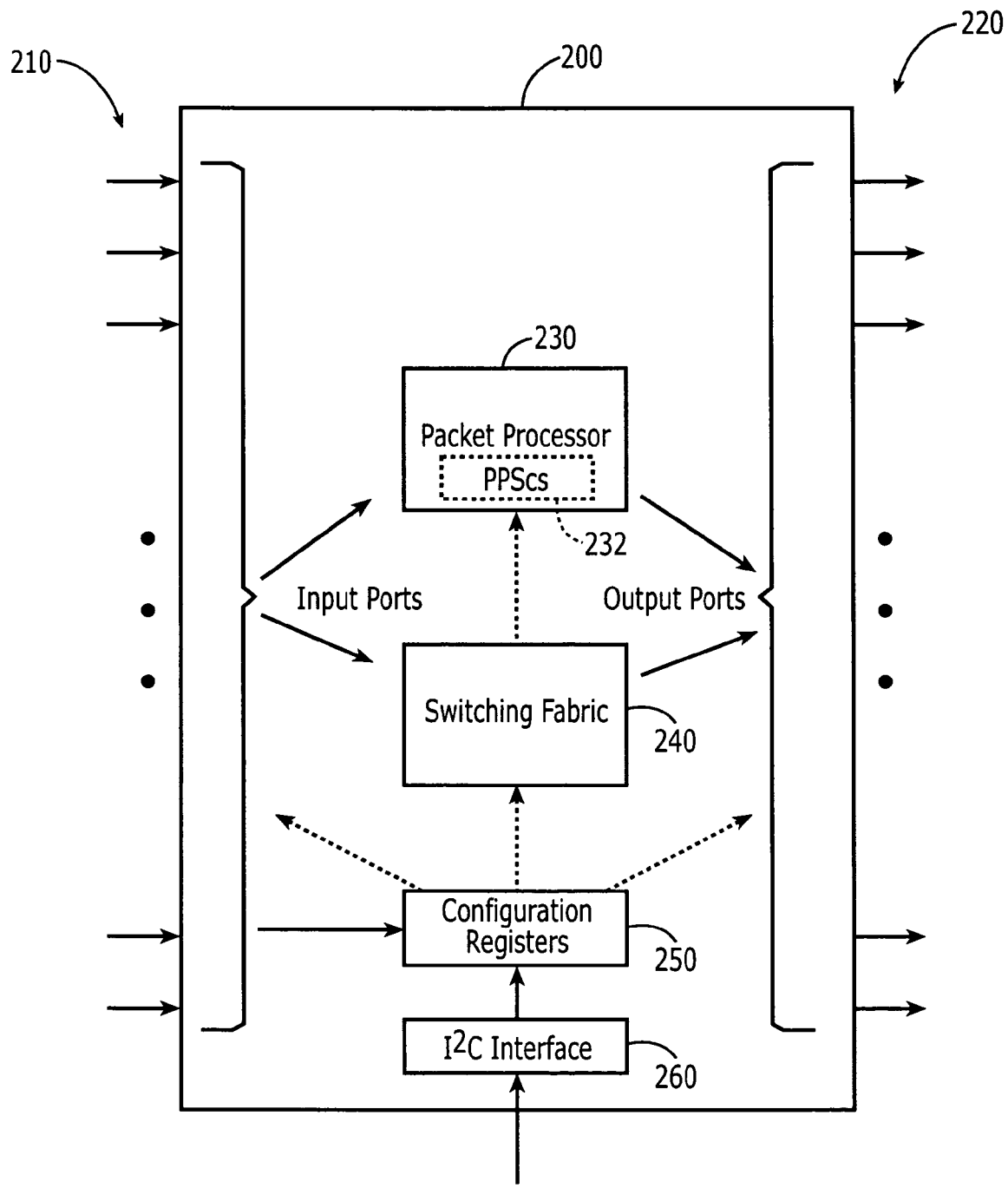
FIG. 2 is a schematic diagram illustrating a packet processing switch integrated circuit chip according to further embodiments of the present invention.

As shown in FIG. 2, a packet processing switch IC chip 200 according to further embodiments of the present invention may be user-configurable to provide various port configurations, packet processing scenarios, and/or switching functions defined in, for example, configuration registers 250. The configuration registers 250 may, for example, store parameters for packet processing scenarios 232 implemented by a packet processor 230, parameters for operations of a switching fabric 240 and/or parameters for configuration of input and output ports 210, 220. As shown, the configuration registers 250 may be configured via one of the input ports 210 and/or via an inter-integrated circuit ($I^2C$) bus interface 260.

An example of an input/output port configurability scheme is illustrated in FIG. 3. In the illustrated example, 40 input/output links (lanes) may be programmable into 4x or 1x ports. Each link may, for example, be configured to handle long and short haul serial transmission as defined, for example, by the RapidIO™ serial specifications. Links 0-3 are programmable into one 4x or one 1x port, Links 4-7 are programmable into one 4x or four 1x ports, and Links 20-23 can be programmed as one 4x port. In the illustrated example, each link is a part of four-link group that is configured together, i.e., Link 3 is not configured with Links 4,5,6, and 7. The ports are numbered from Link 0 to Link 40 in ordered fashion. For example, if Links 0-3 are configured as a 4x port, they are assigned to be port 0; if links 4-7 are configured as individual 1x ports, they are assigned to port numbers 1 to 4. Table 1 illustrates some exemplary configurations:

TABLE 1

| Configuration | Number of 4 × ports (A) | Max number of 1 × ports (B) | Total Links Used = 4A + B | Total ports = A + B |
|---|---|---|---|---|
| 1 | 10 | — | 40 | 10 |
| 2 | 9 | 4 | 40 | 13 |
| 3 | 8 | 8 | 40 | 16 |
| 4 | 7 | 12 | 40 | 19 |
| 5 | 6 | 16 | 40 | 22 |
| 6 | 5 | 16 | 36 | 21 |
| 7 | 4 | 20 | 36 | 24 |
| 8 | 3 | 20 | 32 | 23 |
| 9 | 2 | 20 | 28 | 22 |
| 10 | 1 | 23 | 24 | 21 |
| 11 | — | 24 | 24 | 24 |

Referring again to FIG. 2, the configuration registers 250 may include registers to define port configuration, speed and/or timing (long run/short run), and other port characteristics. These registers can be programmed, for example, through the $I^2C$ bus interface 260 during an initialization procedure. In some embodiments, the $I^2C$ interface 260 may not be employed, and packets received via the input ports 210 may be used instead for device configuration. In such implementations, the input ports 210 may have a default (e.g., power-on) configuration to enable communication with the configuration source. This initial configuration does not have to be the end-desired configuration, but can allow communications to begin with the chip such that a desired configuration can be programmed. An exemplary power-on configuration is shown in FIG. 4, where Link 0 is set to be a 1x port 0 operating at 1.25 Gb/s, Links 4-7 are set to be 1x ports 1-4 operating at 1.25 Gb/s, and the remaining links are assigned to 4x, 1.25 Gb/s ports.

Figure 5:
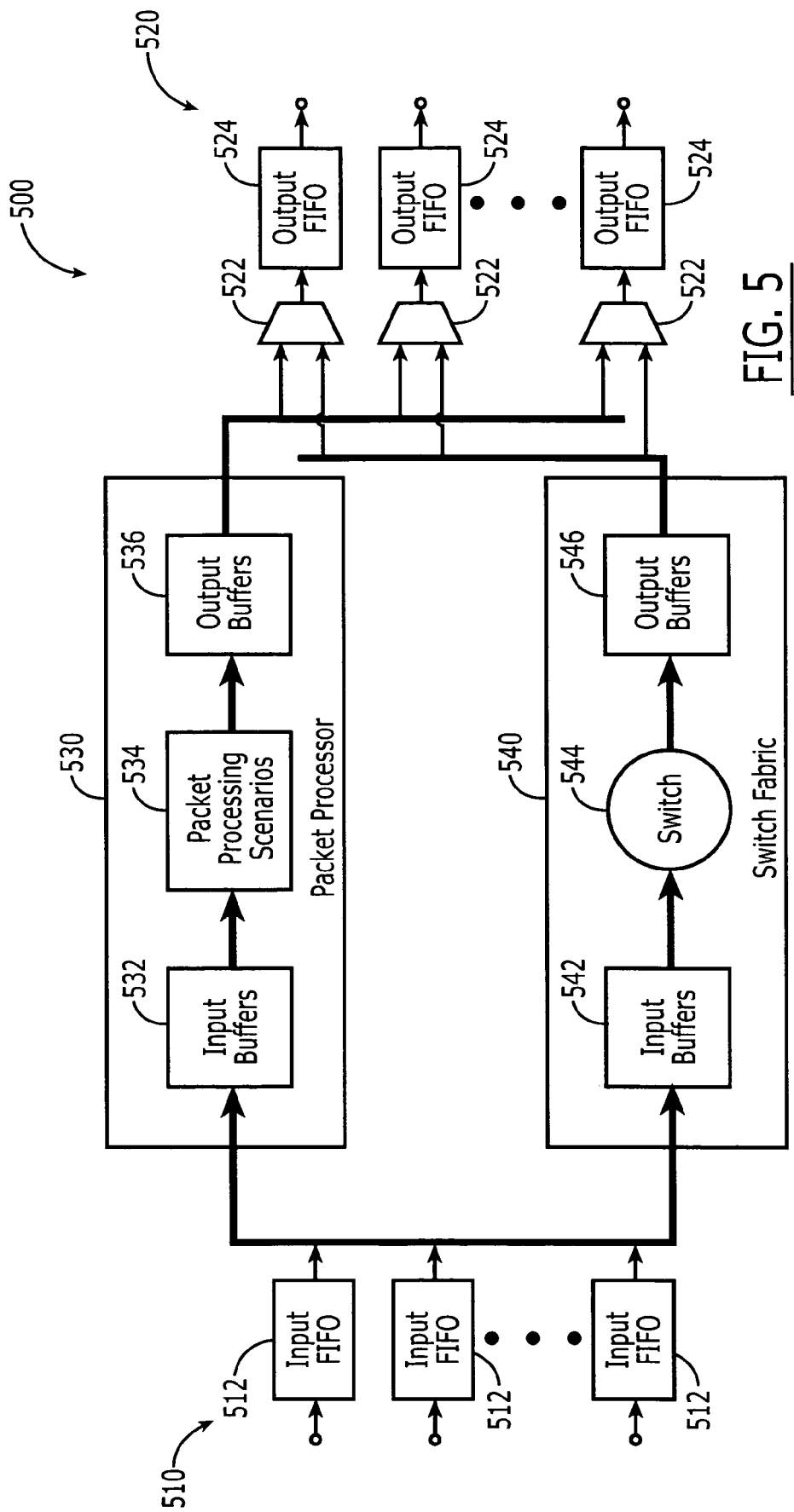
FIG. 5 illustrates an exemplary packet flow architecture for a packet processing switch according to some embodiments of the present invention.

FIG. 5 illustrates an exemplary packet flow architecture for a packet processing switch IC chip 500 according to further embodiments of the present invention. The chip 500 includes input ports 510 including input FIFOs 512 that receive packets from an external source. The received packets are transferred from the input FIFOs 512 to either a packet processor 530 or a switching fabric 540, for example, using destination addresses therein, as described in further detail below. The packet processor 530 and the switching fabric 540 respectively route synthesized packets or payload-unmodified packets to output ports 520, shown as including output FIFOs 524 and associated muxes 522.

Assuming, for purposes of the illustrated embodiments, that the received packets are RapidIO™ packets that include priority fields therein, the received packets intended for the switching fabric 540 may be stored in input buffers 542 based on the priority information in the received packets, and provided to a packet switch 544 according to the priority structure of the input buffers 542. Respective groups of the input buffers 542 are associated with respective ones of the input ports 510. The priority structure of each group of input buffers 542 may be user-configurable. For example, certain buffers may be assigned (e.g., using configuration registers) to receive packets having different ones of RapidIO™ priority levels 0-3. The switch 544 routes the packets from the input buffers 542 to various ones of a plurality of priority-structured groups of output buffers 546, with respective ones of the groups of output buffers 546 being associated with respective ones of the output ports 520.

In the packet processor 530, received packets to be processed in packet processing scenarios 534 are stored in input buffers 532. The packet processing scenarios 534 synthesize packets from the stored received packets. The synthesized packets are stored in output buffers 536, respective groups of which are associated with respective ones of the output ports 520. The synthesized packets may include priority information recovered from the received packets. The packets stored in the output buffers 536, 546 may be routed to the output ports 520 using, for example, round robin scheduling algorithms.

Figure 6:
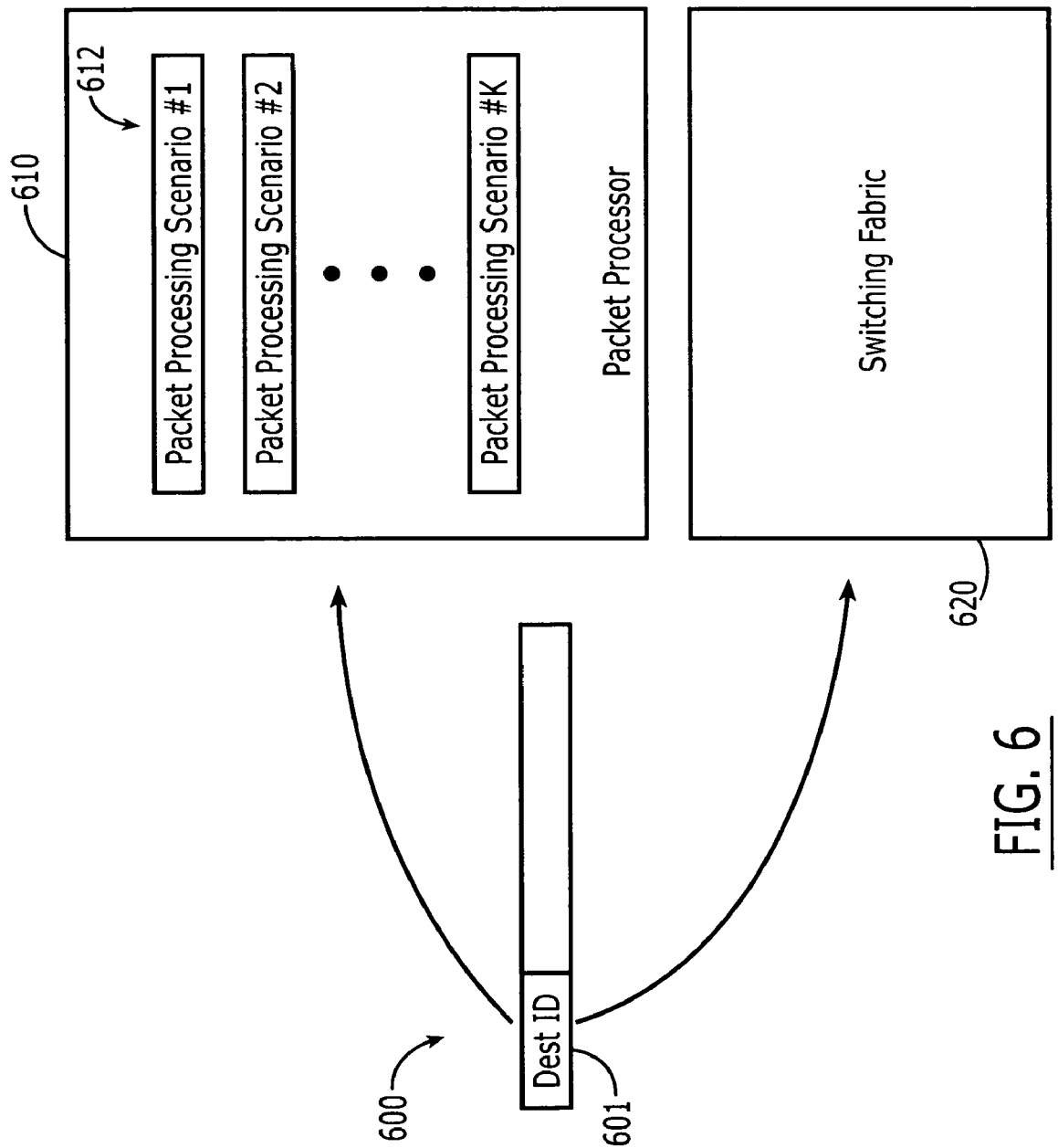
FIGS. 6 and 7 illustrate using packet destination addresses to route packets in a packet processing switch according to further embodiments of the present invention.

According to certain embodiments of the present invention illustrated in FIG. 6, routing of a received packet 600 to a packet processor 610 or a switching fabric 620 may be controlled based on a destination address 601 included in the received packet. In particular, respective destination addresses may be reserved for respective packet processing scenarios 612 supported by the packet processor 610, while other addresses are mapped to the switching fabric 620. Such an approach may be advantageous because it may be desirable that manipulation by the packet processor 610 be transparent to the sending and/or receiving device.

Figure 7:
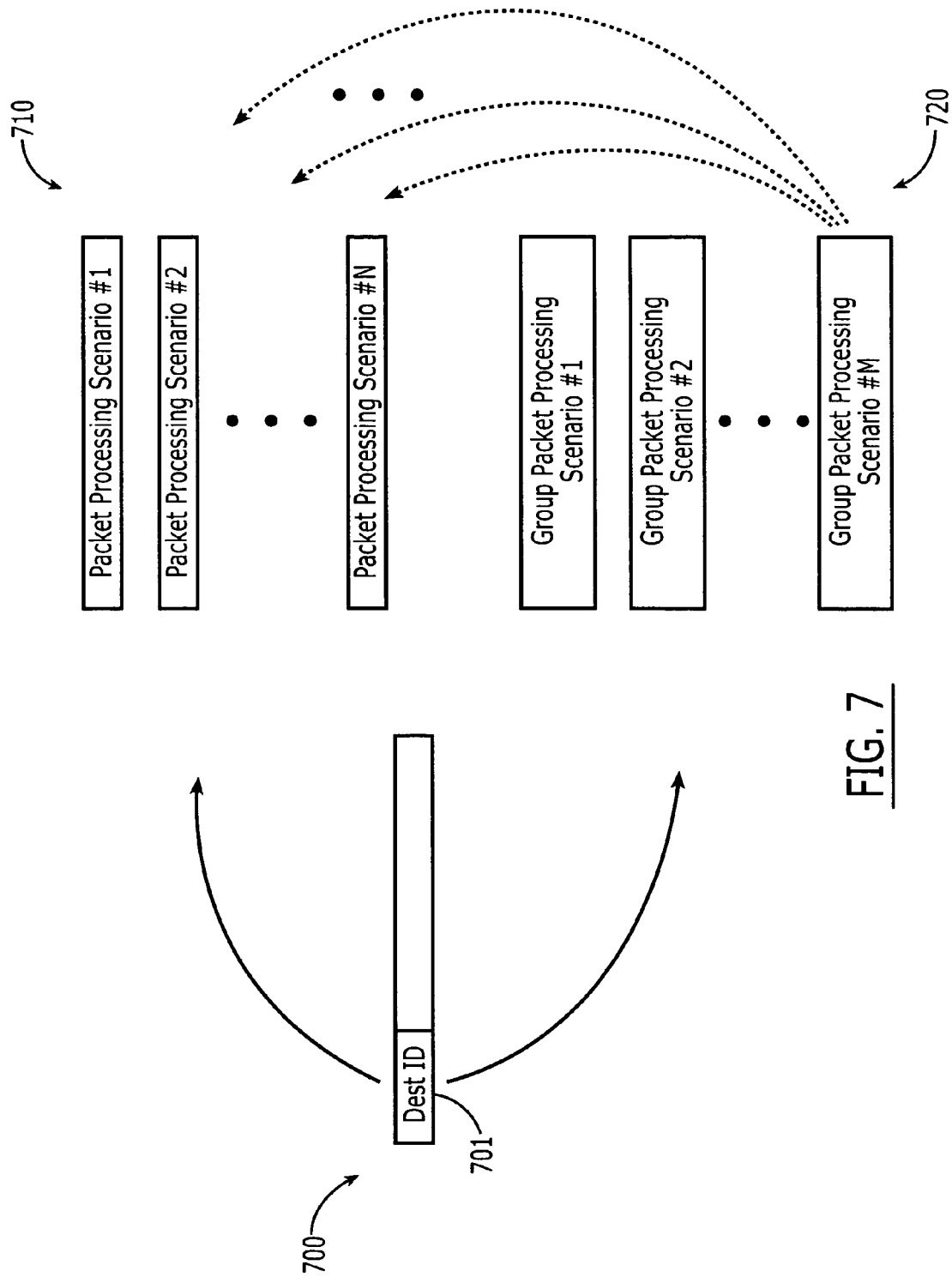
Figure 11:
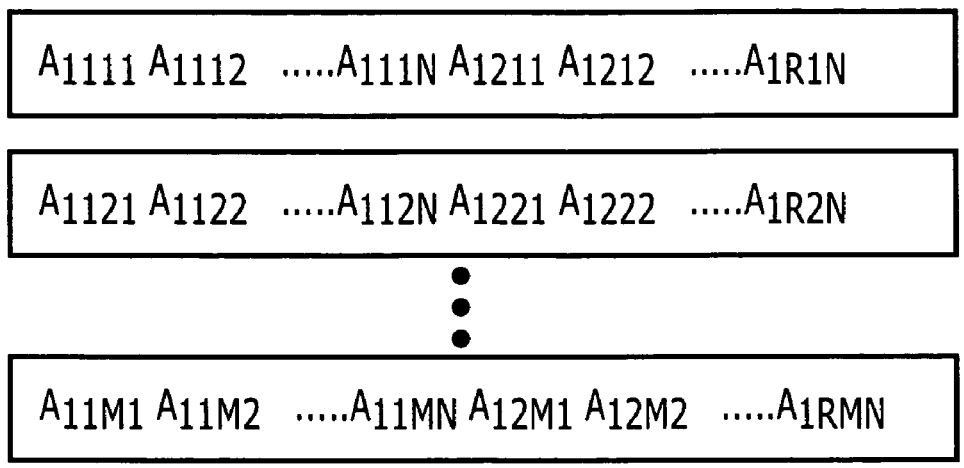
FIG. 11 illustrates exemplary channel queues of a packet processor according to further embodiments of the present invention.

As shown in FIG. 7, packet processing scenarios implemented by a packet processor may include individual packet processing scenarios 710 and group packet processing scenarios 720. The individual packet processing scenarios 710 may be assigned to certain destination addresses 701 of input packets 700. The individual packet processing scenarios may be user configurable using, for example, configuration registers (e.g., the registers 250 of FIG. 2). Such configuration registers may, for example, define payload formats and operations performed on packet payloads for the particular packet processing scenarios. The group packet processing scenario addresses 720 may have other destination addresses 710 assigned thereto. As illustrated, the group packet processing scenarios 720 may be used to cause received packets to be multicast to groups of the individual packet processing scenarios 710 for parallel processing. Such groupings of individual packet processing scenarios may be configurable using, for example, configuration registers.

FIG. 8 illustrates an exemplary packet processing scenario 800 according to some embodiments of the present invention. The scenario 800 includes sample processing block 810, which may include, depending on the configuration of the scenario 800, initial sample and sub-sample level operations, such as increasing (padding) or decreasing the number of bits in a sample and/or flipping the order of bits and/or subsamples before queuing samples associated with separate channels (e.g., antennas) in separate queues in a queuing block 820. The queued samples may be further processed in the sample processing block 810 before transmission to a packet construction block 830, which creates new synthesized packets from the processed samples.

A packet processing scenario may receive, for example, packets corresponding to M channels, with N signal samples per channel and R repetitions of this structure in each packet. After termination of the packet overhead, packet payloads stored in the packet processor input buffers may look as illustrated in FIG. 9, where the payloads include reserved user fields (i.e., fields that are not processes) and signal samples $A_{111}, \ldots, A_{RMN}; B_{111}, \ldots, B_{RMN}; \ldots; X_{111}, \ldots, X_{RMN}$. As shown in FIG. 10, each of the samples $A_{111}, \ldots, A_{RMN}, B_{111}, \ldots, B_{RMN}, \ldots X_{111}, \ldots, X_{RMN}$ may, in turn, include multiple sub-samples, for example, I and Q channel sub-samples $I_0, \ldots, I_{B-1}, Q_0, \ldots, Q_{B-1}$. The sample format recognized by each packet processing scenario and/or the operations performed in each scenario may be register-configurable.

Beyond bit extension/truncation operations, the sample processing 810 may include reordering operations, such as rearranging the order of subsamples and/or the order of bits within samples. For example, assuming a sample is 4 bits I and 4-bits Q, the sample processing 810 may including flipping the I and Q subsamples individually as follows:

| Input: | $I_0 I_1 I_2 I_3 Q_0 Q_1 Q_2 Q_3$ |
|---|---|
| Output: | $I_3 I_2 I_1 I_0 Q_3 Q_2 Q_1 Q_0$ |

The sample processing 810 may also rearrange the order of subsamples in a sample as follows:

| Input: | $I_0 I_1 I_2 I_3 Q_0 Q_1 Q_2 Q_3$ |
|---|---|
| Output: | $Q_0 Q_1 Q_2 Q_3 I_0 I_1 I_2 I_3$ |

The sample processing 810 may also interleave I and Q bits as follows:

| Input: | $I_0 I_1 \ldots I_{B-1} Q_0 Q_1 \ldots Q_{B-1}$ |
|---|---|
| Output: | $I_0 Q_0 I_1 Q_1 \ldots I_{B-1} Q_{B-1}$ |

These and other operations in the sample processing 810 may need to be performed in a particular order to maintain sample integrity. For example, assuming that input samples have an IQ format, are IQ interleaved, and each I and Q subsample has 6 bits, to produce an interleaved, IQ-flipped, sign-extended output, operations may need to be performed as follows:

| Input: | $I_0 Q_0 I_1 Q_1 I_2 Q_2 I_3 Q_3 I_4 Q_4 I_5 Q_5$; |
|---|---|
| Deinterleave I and Q: | $I_0 I_1 I_2 I_3 I_4 I_5 Q_0 Q_1 Q_2 Q_3 Q_4 Q_5$; |
| Sign extend from LSB to 8 bits: | $I_0 I_1 I_2 I_3 I_4 I_5 I_5 I_5 Q_0 Q_1 Q_2 Q_3 Q_4 Q_5 Q_5 Q_5$; |
| Flip: | $I_5 I_5 I_5 I_4 I_3 I_2 I_1 I_0 Q_5 Q_5 Q_5 Q_4 Q_3 Q_2 Q_1 Q_0$; |
| Change IQ order: | $Q_5 Q_5 Q_5 Q_4 Q_3 Q_2 Q_1 Q_0 I_5 I_5 I_5 I_4 I_3 I_2 I_1 I_0$; and |
| IQ Output Interleave: | $Q_5 I_5 Q_5 I_5 Q_5 I_5 Q_4 I_4 Q_3 I_3 Q_2 I_2 Q_1 I_1 Q_0 I_0$. |

As shown in FIG. 9, after initial processing, samples corresponding to respective ones of the M channels are placed in respective queues.

Figure 12:
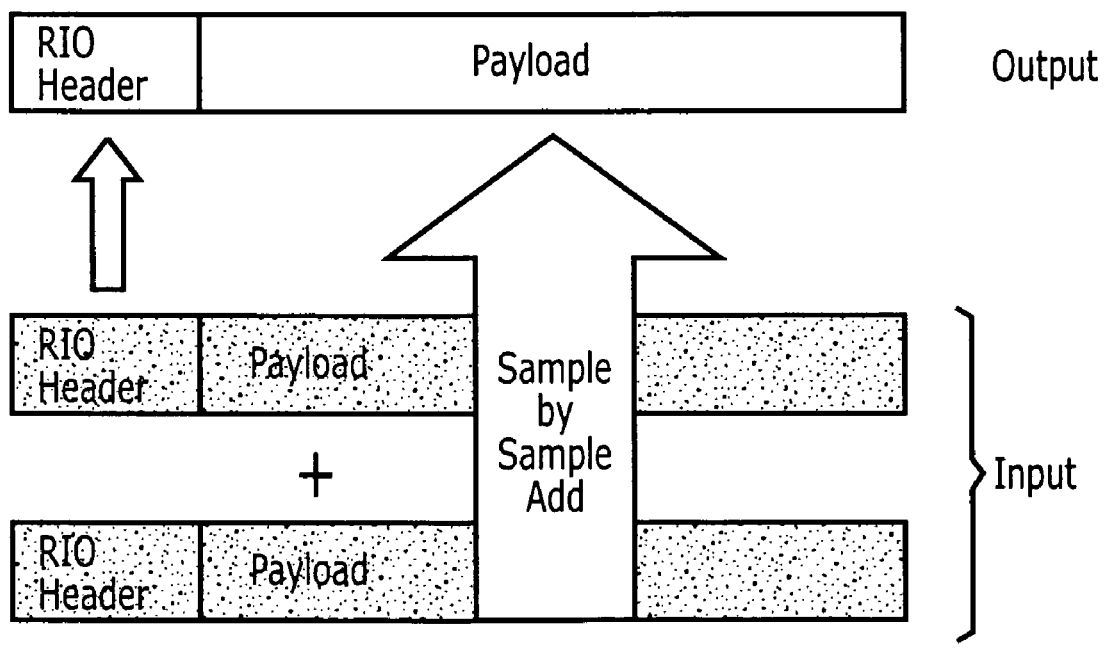
FIGS. 12 and 13 illustrate exemplary summing operations of a packet processor according to some embodiments of the present invention.
Figure 13:
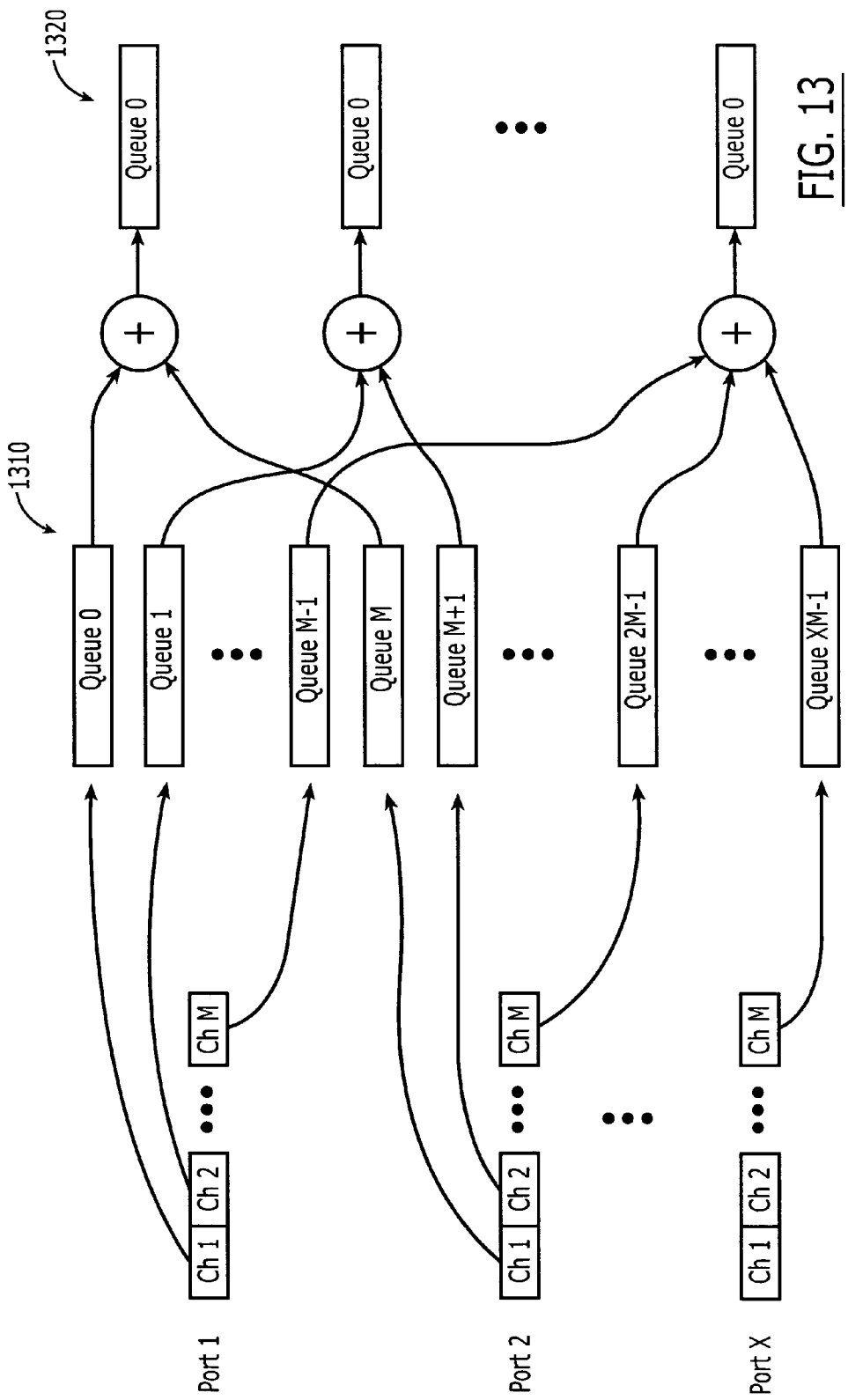

A given packet processing scenario also may be set up to provide for summing or other arithmetic operations on payloads from multiple packets, as illustrated in FIG. 12. In particular, as shown in FIG. 13, a new set of queues 1320 may be established to hold summation results from summing samples from multiple ports that are stored in other queues 1310. If summing is included in a particular scenario, certain bit manipulation operations of the sample processing, such as deinterleaving and bit extension or deletion, may have to be performed before summation, while other operations, such as flipping, I-Q ordering and interleaving, may need to be performed after summation.

Exemplary use of a packet processing switch chip in a wireless base station environment according to some embodiments of the present invention will now be described with reference to FIGS. 14-20. It will be appreciated that these examples are offered for purposes of illustration, and that the present invention is not limited to the specific operations and architectures illustrated or, more generally, to application in wireless applications.

Figure 14:
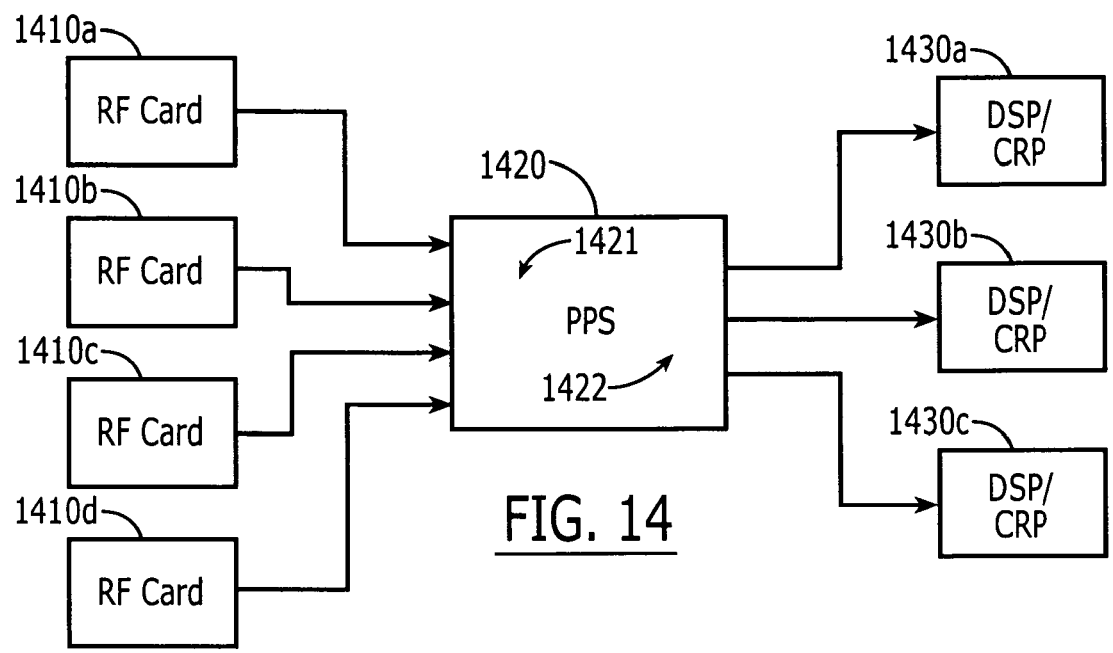
FIG. 14 illustrates an exemplary packet processing switch interface circuit application according to further embodiments of the present invention.

A typical wireless base station architecture is shown in FIG. 14, where four RF cards 1410a, 1410b, 1410c, 1410d provide packets containing radio signal samples to respective input ports 1421 of a packet processing switch (PPS) chip 1420. The chip 1420 processes payloads of the received packets, producing packets that are transmitted to respective digital signal processors/chip rate processors (DSPs/CRPs) 1430a, 1430b, 1430c via respective output ports 1422. It will be appreciated that the DSPs/CRPs 1430a, 1430b, 1430c may, for example, be configured to perform certain baseband processing functions, such as demodulation and decoding, on the signal samples produced by the RF cards 1410a, 1410b, 1410c, 1410d. For purposes of the following examples shown in FIGS. 15-20, each RF card 1410a, 1410b, 1410c, 1410d has 2 antenna channels, designated as Ant A and Ant B, per card. Each I and Q component is assumed to be 8 bits (1 byte), with no bit interleaving. The number of adjacent samples in a serial packet from the same antenna is 2, and the repetition is 2. Each packet from each RF card will contain 8 samples, including 4 samples from antenna A and 4 samples from antenna B. The incoming packets to the PPS chip 1420 on the respective input ports 1421 may look as illustrated in FIG. 15. Some preprocessing, such as bit extension/deletion operations, will not be illustrated. FIG. 16 illustrates queues 0-7 formed for the respective channels after preprocessing.

A first example of packet processing according to some embodiments of the present invention is illustrated in FIG. 17. A single packet is synthesized from all of the queues 1-7, with no summing of the samples. The synthesized packet is sent to output ports 20, 22, and 23, addressed to a specific memory address in a target device.

A second example of packet processing according to further embodiments of the present invention is illustrated in FIG. 18. Multiple synthesized packets are generated from the queues 0-7 illustrated in FIG. 16, with each synthesized packet including 4 samples from each queue. All of the synthesized packets are sent to output ports 20, 22, and 23, and each is addressed to a respective memory address of a target device.

In some applications, a user may want to send different packets to different destination groups. To do this, the user may send the packet to a group packet processing scenario address using an addressing scheme along the lines described above with reference to FIG. 7. This results in parallel operation of multiple packet processing scenarios, with each input packet being received by each of the multiple scenarios. The scenarios can independently process the packets, and generate different packets and send them to different ports.

An example of such multiple-packet to multiple-destination packet processing according to further embodiments of the present invention is illustrated in FIG. 19. The user sends a packet destined to a group packet processing scenario, which maps to two individual packet processing scenarios. The first scenario takes inputs from queues 0, 2, 4 and 6. The packet produced by the first scenario is sent to output ports 20, 22. The second scenario takes inputs from queues 1, 3, 5, and 7. The packet produced by the second scenario is sent to output port 23.

FIG. 20 shows an example wherein summing is enabled. When summing is enabled, respective channels are summed and new queues are formed. The resulting synthesized packet is sent to output ports 20, 22 and 23.

Referring again to FIG. 1, packets that are received at any of the input ports 110 of a packet processing switch IC chip 100 may be packets (e.g., signal sample packets) that require processing in the packet processor 120 or packets that are to be forwarded by the switching fabric 130 without payload modification. In addition, packets for different packet processing scenarios 132 may be multiplexed at any of the input ports. It is generally desired that operations of the packet processor 130 be synchronized to maintain desired data rates and to meet other timing criteria. Exemplary operations for synchronizing packet processing operations will now be described with reference to FIGS. 21-26.

According to some embodiments of the present invention, a packet processor operates using a dynamic packet accumulation approach. Once all incoming packets needed to complete a particular scenario have been accumulated at the device, they are processed to form one or more output packets associated with the scenario. The output packet(s) is then transmitted out of the output port(s) associated with the scenario. In some embodiments, each packet processing scenario processes one input packet per port per processing interval, with all input packets being used by a particular scenario running at substantially the same data rate and having the same size and format.

Figure 21:
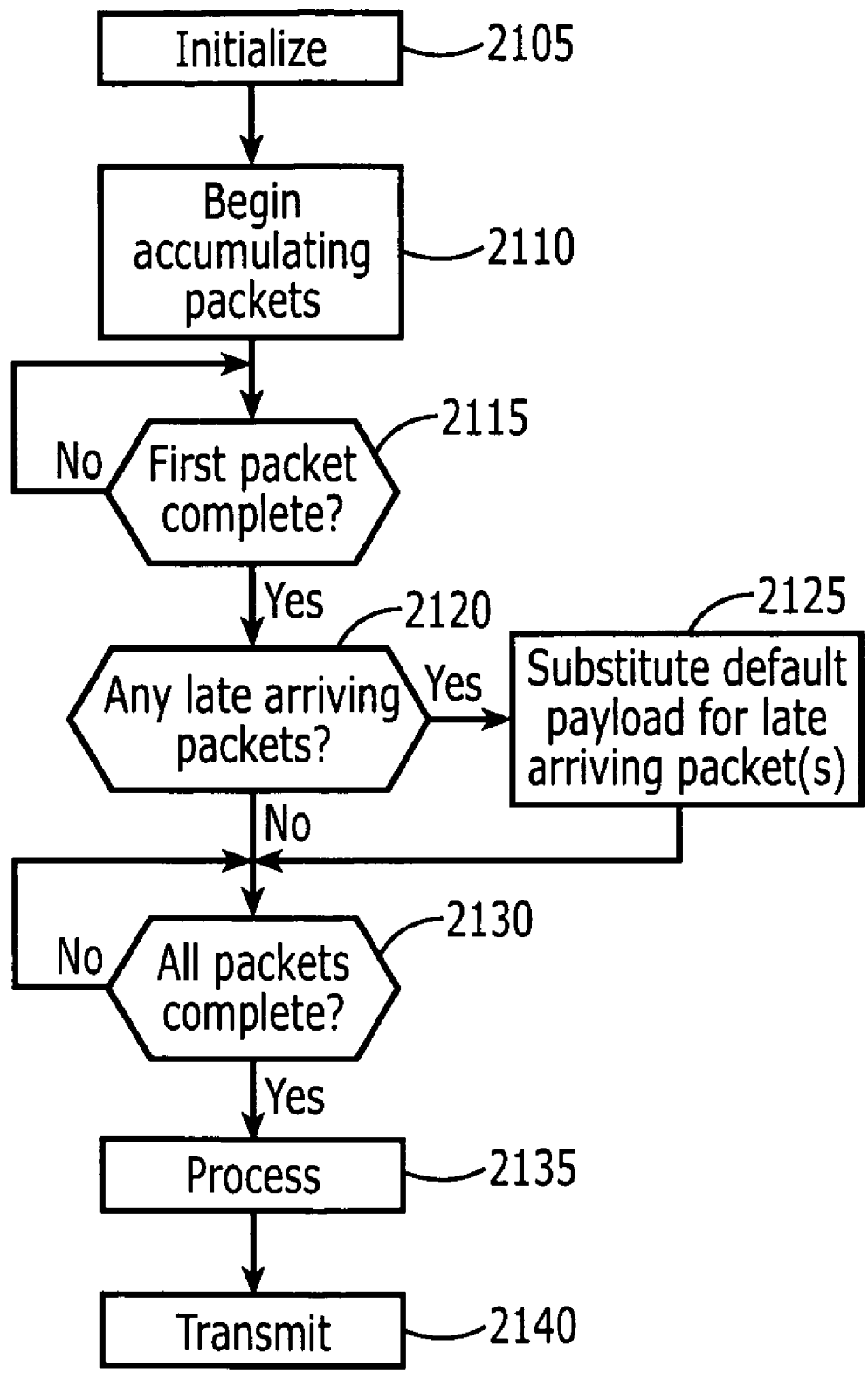
FIG. 21 illustrates exemplary operations of a packet processor according to some embodiments of the present invention.

In some embodiments, dynamic packet accumulation may be implemented using a state machine that transitions responsive to accumulation and processing events. Each scenario may be configured (e.g., via configuration registers, such as the configuration registers 250 in FIG. 2) with knowledge of the input ports that will be providing packets. Referring to FIG. 21, after initialization of the state machine (block 2105), packets for a scenario begin accumulating (block 2110). In the illustrated embodiments, it is required that all packets destined for the scenario start accumulating within the accumulation time for a first arriving packet; the payload for any packet arriving after the first packet has completed accumulation is replaced with a default payload (blocks 2115, 2120, 2125). After all packets that meet the requirement to start accumulation in the accumulation window defined by the accumulation time of the first-arriving packet have completed accumulation, the packets (i.e., the accumulated packet and, in some cases, any replacement packets) are processed to generate one or more output packets (blocks 2130, 2135), which are then transmitted (block 2140). A new accumulation period (block 2110) may commence after processing of the previously received packets begins.

A packet processing scenario may be initialized, for example, by a write to an initialization register or some other initialization signal. A succeeding received packet associated with the packet processing scenario (e.g., a packet addressed to the scenario's address) may then be considered as the first packet into the scenario.

Figure 22:
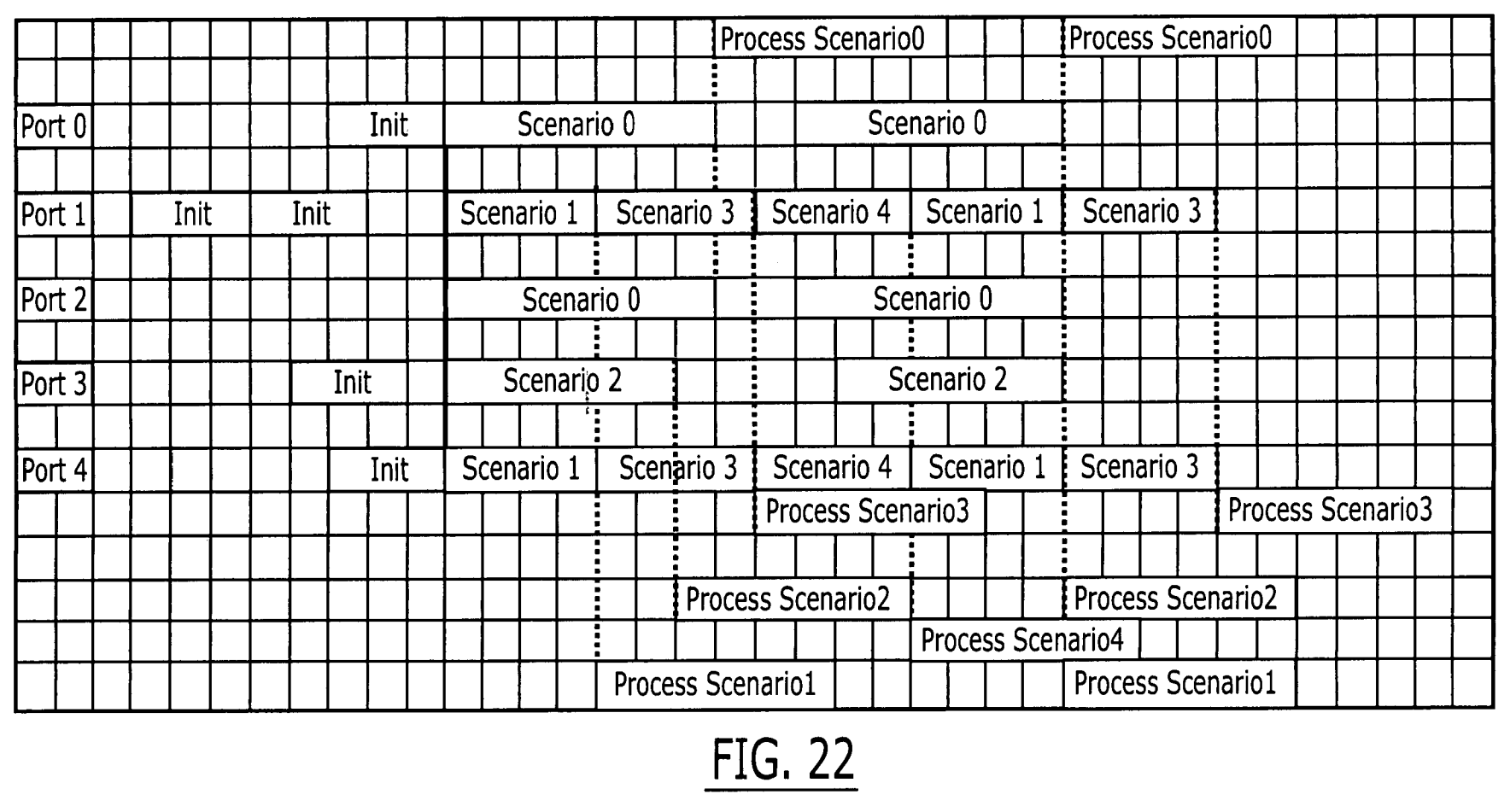
Figure 23:
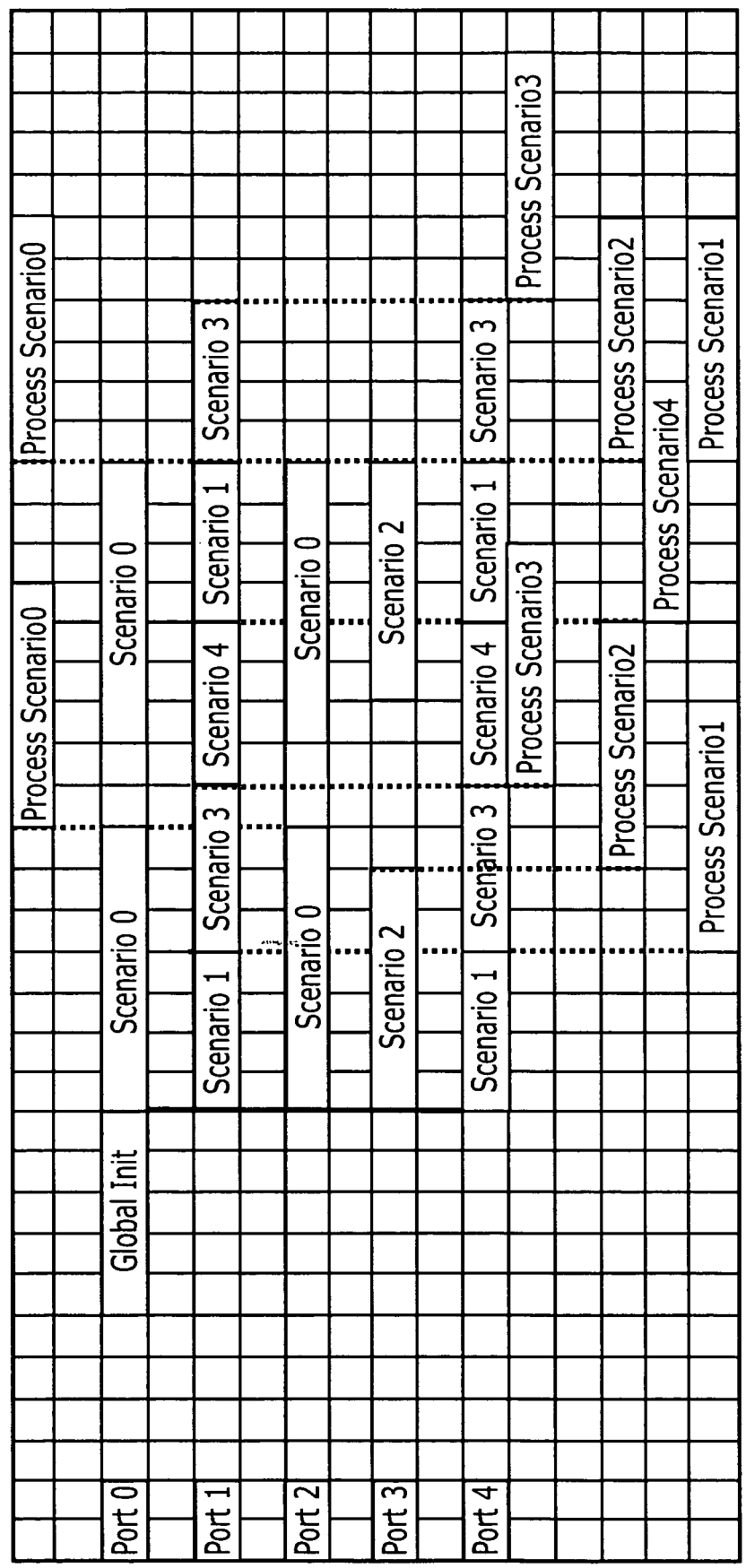

FIG. 22 illustrates Scenarios 0-4, which can be synchronized independent of one another by sending respective initiation signals Init1-Init4. If an initialization signal is sent to a group packet processing scenario along the lines described above with reference to FIG. 7, all related individual packet processing scenarios may be initialized. If an input port is used for more than one scenario, the initialization signals for the multiple scenarios may be received on the same port or on separate ports. After receipt of its initialization signal, a packet processing scenario begins accumulating packets (as shown in the shaded areas), followed by processing of the accumulated packets to synthesize new packets. As shown in FIG. 22, accumulation of packets for any given scenario begins with the start of accumulation of a first-arriving packet for the scenario. Generally, scenarios do not have to start at the same time. In further embodiments, a "global" initialization may be achieved, for example, by writing to a global initialization register and/or by simultaneously providing initialization signals to all packet processing scenarios, as shown in FIG. 23. A global initialization signal may come via any port.

Different scenarios may have different latencies associated with the size and packet processing needed. Generally, processing time is dependant on the amount of data sent to a scenario (size of packet and number of incoming ports), and the type of calculation (sample manipulation, addition, etc.).

Figure 24:
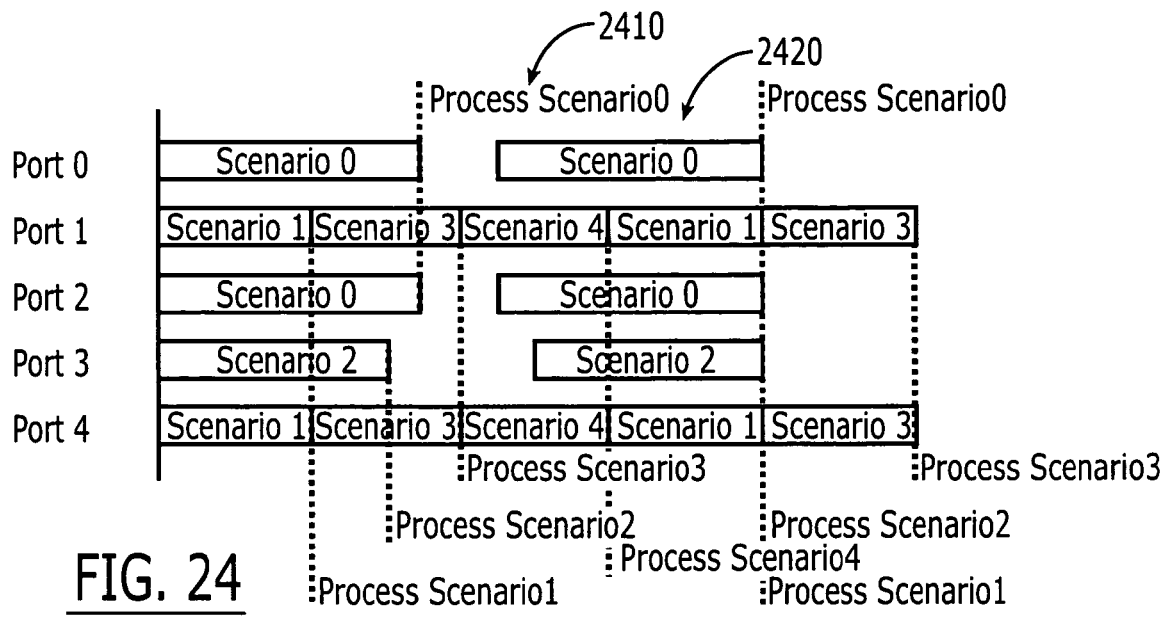
FIGS. 24-27 illustrate exemplary timing relationships for packet processing scenarios according to some embodiments of the present invention.

FIG. 24 shows an example in which 5 scenarios 0-4 are in operation. Scenario 0 has space between the arrival of first and second packets on ports 0 and 2, illustrating that processing time may dictate how often a packet can be sent to a given scenario from a given port. In particular, processing 2410 for a first iteration of Scenario 0 may occur concurrent with accumulation of packets for a succeeding second iteration 2420 of Scenario 0. Scenario 2 is similar to Scenario 0, except that Scenario 2 has a smaller packet size and a longer processing time, which means that packets for Scenario 2 are sent at lower rate than for Scenario 0. Port 1 and port 4 receive packets destined for multiple Scenarios 1, 3 and 4, illustrating that a port may be more efficiently used by "hiding" the processing time for a particular scenario by sending a packet for a different scenario during the processing interval. By multiplexing packets for multiple scenarios on Port 1 and Port 4, throughput may be increased.

The dynamic packet accumulation described above can provide significant flexibility in system synchronization. According to some embodiments of the present invention, packet processing scenarios wait for the first packet to arrive to begin the accumulation phase on a per scenario basis. This allows for initialization of the packet processor before bringing up the transmitters connected to the device, because each scenario begins operating after it begins receiving packets.

Figure 25:
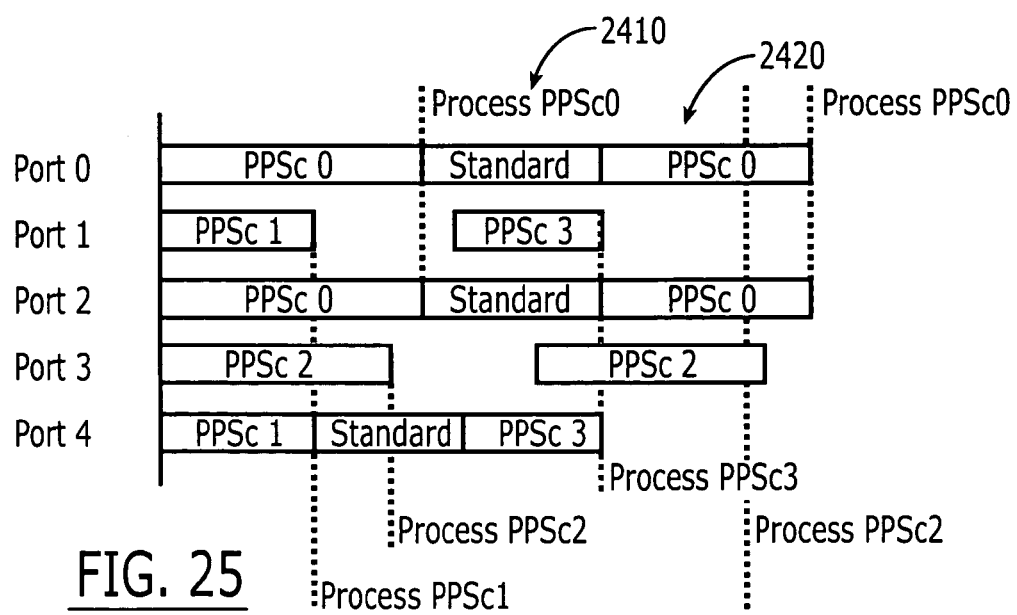

If a "standard" packet that is not intended for payload processing (e.g., a packet that is to be routed by a switching fabric, such as the switching fabric 130 of FIG. 1) is sent to a port that is also receiving packets that require payload processing, the standard packet may be received during idle time (e.g., processing time) of the port. This is illustrated in FIG. 25, where standard packets are multiplexed with packets intended for packet processing scenarios PPSc1-3. If no ports have sufficient idle time to "fit" a standard packet, then the user could dedicate ports for packets to be payload-processed and separate ports for standard packets.

Figure 26:
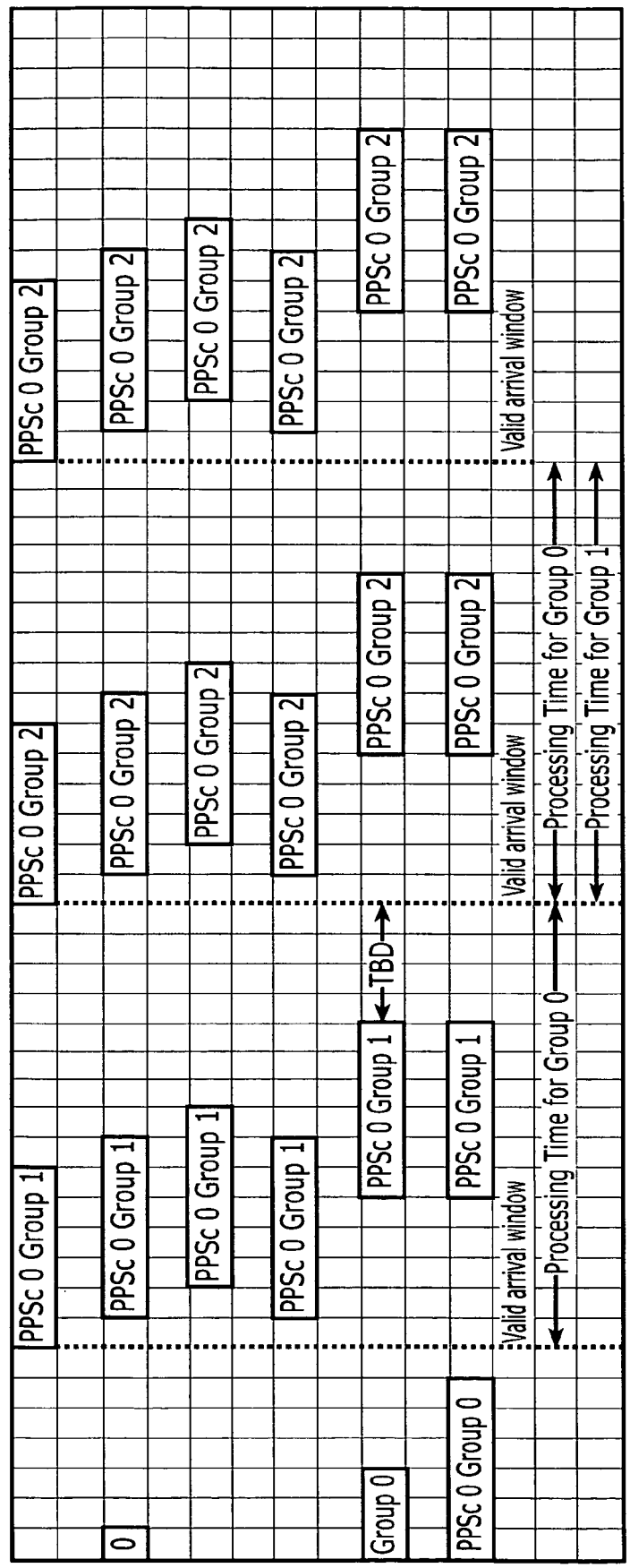

Accumulation of packets may be limited to an accumulation window defined by arrival of a first packet. This requirement can tie the valid arrival window for packets going to the same scenario to the data rate of the links, as illustrated in FIG. 26. As shown, a packet of a group PPSc 0 Group 0 on Port 2 arrives first and dictates the valid arrival window for all other packets destined for the same scenario PPSc0. As shown, a packet from the same group on Port 5 is late, arriving after the packet on Port 2 has accumulated. The packet on Port 5 may be ignored, e.g., a value of all zeros (or some other value) may be used in its place during processing. A next accumulation window is started with the arrival of a first packet of a group PPSc 0 Group 1 after all previous valid Group 0 packets have finished processing. As described above, the arrival time of the next group of packets into the packet processor may be dictated by the processing time of the previous group.

Figure 27:
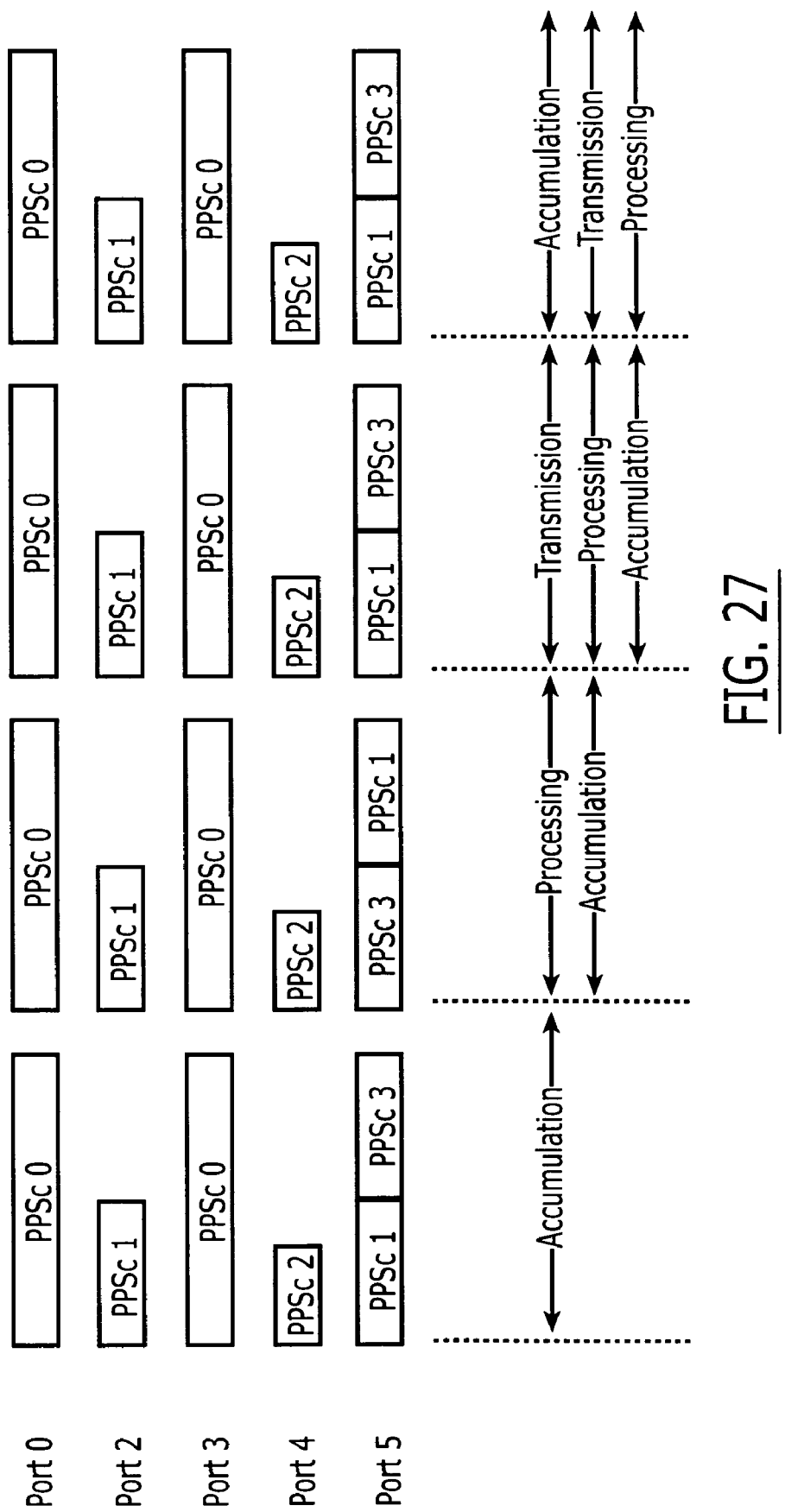

In further embodiments of the present invention, a time-division multiplexed (TDM) mode of operation may be achieved by sending packets at times dictated by the longest processing time of all the operative scenarios in the packet processor. Referring to FIG. 27, arrival times of all packets for packet processing scenarios PPSc 0-3 can be controlled such that the windows 2710 shown in FIG. 27 are wide enough to support the longest processing time of all the scenarios. The packet processor may be configured to control transmission of outgoing packets from the scenarios PPSc 0-3 to make the device appear to be operating in a TDM mode. In particular, the device may initiate transmission of outgoing packets with the start of accumulation of a next incoming group of packets after processing of the outgoing packets has completed.

Figure 28:
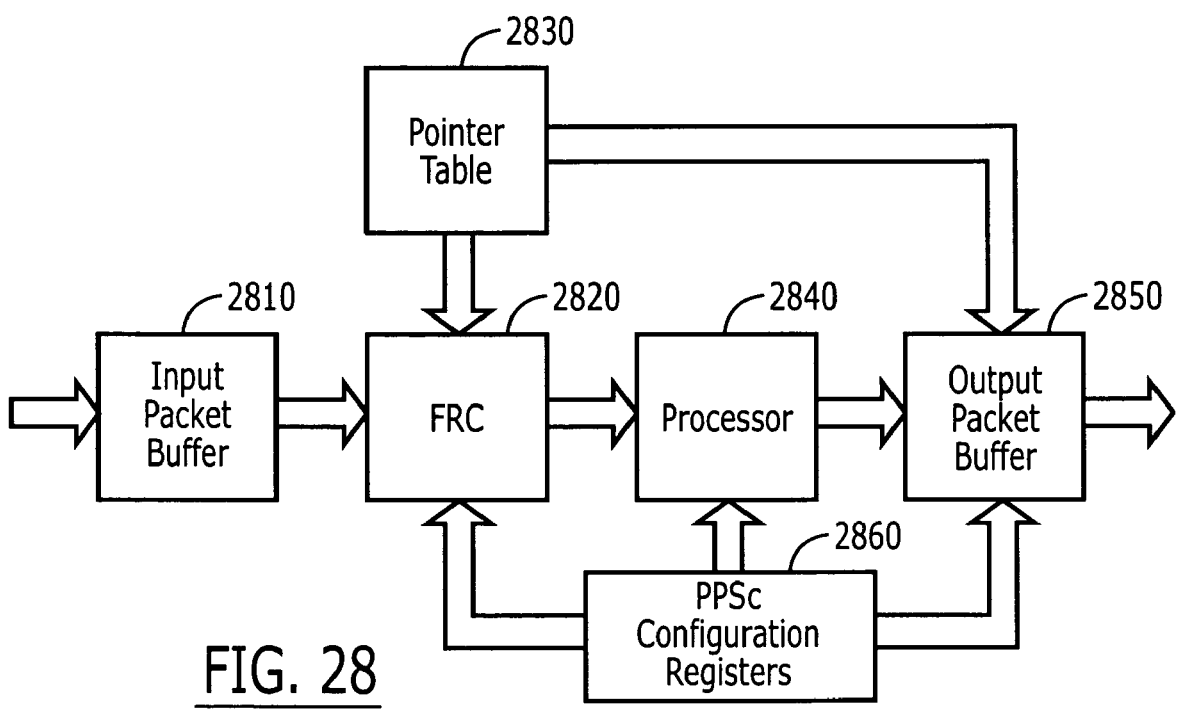
FIGS. 28 and 29 illustrate packet processors and exemplary operations thereof according to further embodiments of the present invention.

FIG. 28 illustrates an alternative configuration for a packet processor 2800 (e.g., a packet processor for use in a packet processing switch, such as the packet processing switch 100 of FIG. 1) according to further embodiments of the present invention. The packet processor 2800 includes an input packet buffer 2810 configured to store incoming packets. A FIFO Read Controller (FRC) 2820 reads data (e.g., signal samples from payloads of received messages) from the input packet buffer 2810 as specified by a pointer table 2830. The pointer table 2830 relates input data locations in the input packet buffer 2810 to output data locations in an output packet buffer 2850. A processor 2840 performs sample manipulation as specified by information stored in packet processing scenario (PPSc) configuration registers 2860. Processed data output by the processor 2840 is written into the output packet buffer 2850, which constructs output packets therefrom.

Figure 29:
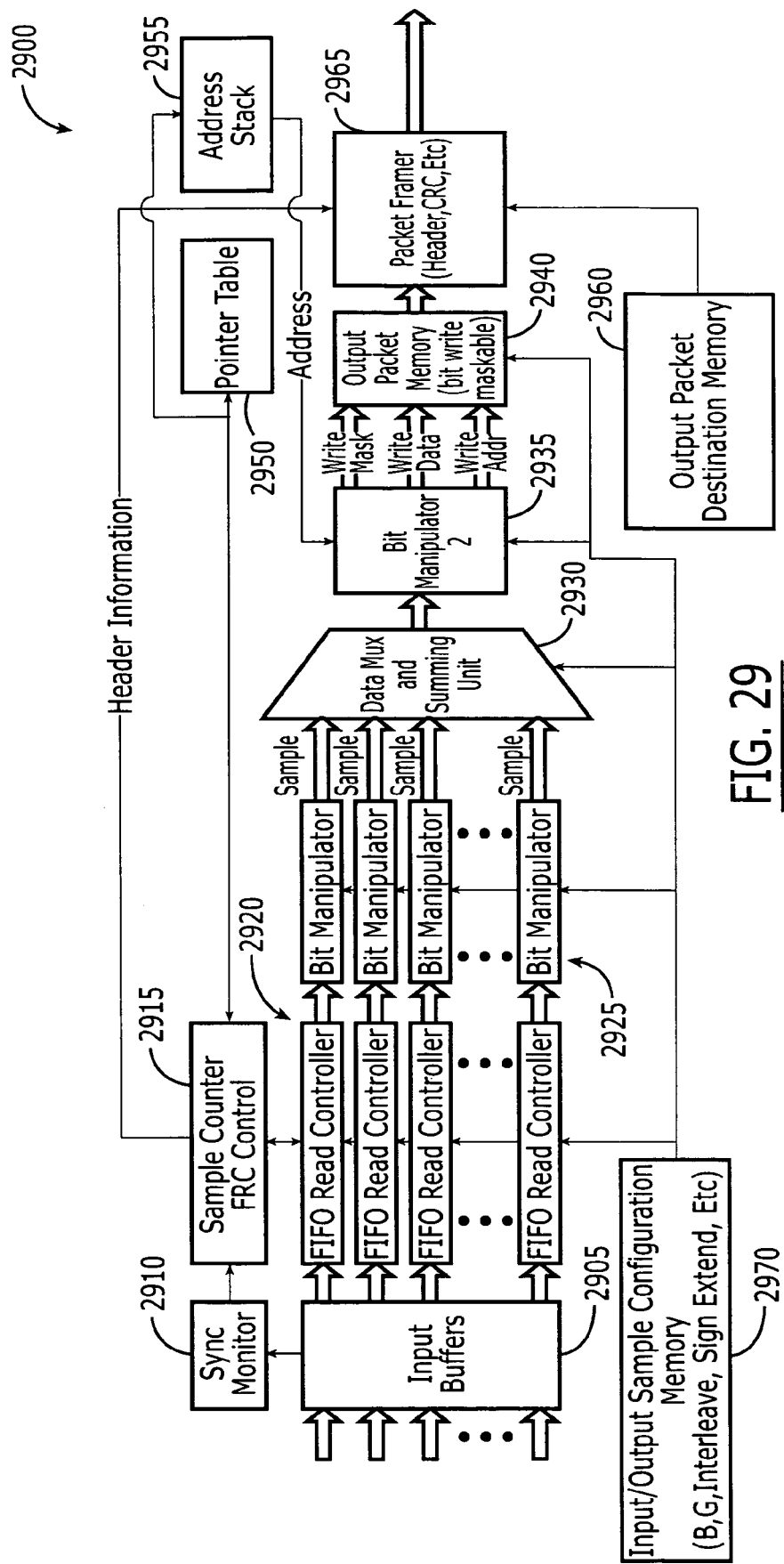

FIG. 29 illustrates an exemplary configuration for a packet processor along the lines described above with reference to FIG. 28 according to further embodiments of the present invention. A packet processor 2900 includes input buffers 2905 that are configured to receive packets from a plurality of ports (not shown). A synchronization monitor module 2910 monitors the timing of the incoming packets and extracts header information therefrom via FRCs 2920 that access packets stored in the input buffers 2905. The extracted header information is provided to a packet framer 2965 for use in constructing output packets including payload information generated by processing payload information in the input packets received by the input buffers 2905.

The FRCs 2920 access packets stored in the input buffers 2905 responsive to control signals generated by a sample counter and FRC control unit 2915. The sample counter and FRC control unit 2915 generates the control signals responsive to error and control information generated by the synchronization monitor module 2910, address information from a pointer table 2950, and packet processing scenario control information from configuration registers of an input/output sample configuration memory 2970. The FRCs 2920 transfer payload data from the input buffers 2905 to a set of first bit manipulators 2925, which perform de-interleaving, sign extension and/or bit deletion operations as specified by packet processing scenario control information stored in the input/output sample configuration memory 2970.

A data mux and summing unit 2930 performs summation operations as specified by packet processing scenario control information stored in the input/output sample configuration memory 2970, and may further perform dynamic/saturation ranging of the summation outputs. The output of the data mux and summing unit 2930 is provided to a bit manipulator 2935, which performs flipping (e.g., MSB/LSB), IQ ordering and/or IQ interleaving operations as specified by packet processing scenario control information stored in the input/output sample configuration memory 2970. The bit manipulator 2935 provides the processed data, along with an address and mask, to an output packet memory 2940. Data is transferred from the output packet memory 2940 to the packet framer 2965, which constructs new packets using header information from the sample counter and FRC control unit 2915 and an output packet destination memory 2960.

It will be appreciated that the packet processing switch architectures describe above are illustrative examples, and that other packet processing switch architectures fall within the scope of the present invention. More generally, in the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A packet switching integrated circuit chip, comprising:
a plurality of input ports configured to receive packets from respective external sources, respective ones of the input ports comprising respective sets of one or more lanes;
a plurality of output ports configured to transmit packets to respective external recipients, respective ones of the output ports comprising respective sets of one or more lanes;
a packet switching fabric configured to route packets to selected ones of the output ports without payload modification;

a packet processor configured to receive packets, to extract payloads from the received packets, to perform bit-level transformations on the extracted payloads, to construct new packets comprising the new payloads and to route the new packets to selected ones of the output ports; and control circuitry configured to selectively route first packets received at the input ports to the switching fabric and second packets received at the input ports to the packet processor.

2. A chip according to claim 1, wherein the packet processor supports a plurality of packet processing scenarios for packet payloads.

3. A chip according to claim 2, wherein the packet processor selectively applies the packet processing scenarios to packet payloads based on destination addresses in the packets.

4. A chip according to claim 2, wherein the plurality of packet processing scenarios comprises individual packet processing scenarios and group packet processing scenarios that invoke concurrent processing by selected ones of the individual packet processing scenarios.

5. A chip according to claim 2, wherein timing of each packet processing scenario is controlled responsive to received packet accumulation for the packet processing scenario.

6. A chip according to claim 5, wherein the packet processor is configured to initiate packet accumulation for a packet processing scenario responsive to an initialization signal.

7. A chip according to claim 2, wherein the packet processing scenarios are user-configurable.

8. A chip according to claim 1, wherein the control circuitry is configured to selectively route the first and second packets to the packet processor and the switching fabric from the input ports based on destination addresses therein.

9. A chip according to claim 1, wherein packets generated by the packet processor are destination addressed based on destination addresses in the received packets from which they are generated.

10. A chip according to claim 1, wherein the packet processor is configurable to perform bit extension, bit truncation, bit reordering and/or bit arithmetic operations on the received packets.

11. A chip according to claim 1, wherein the packet switching fabric and/or the packet processor are configured to route packets according to priority identifiers therein.

12. A chip according to claim 11, wherein the packet switching fabric comprises:

a plurality of sets of input buffers, respective ones of the sets of input buffers configured to receive and store packets from respective ones of the input ports according to priority identifiers in the packets;

a plurality of sets of output buffers configured to receive and forward packets to respective ones of the output ports; and a switch configured to transfer packets from the input buffers to the output buffers based on the destination addresses therein and according to priority designations of the input buffers.

13. A chip according to claim 12, wherein the priority designations of the input buffers are user configurable.

14. A chip according to claim 1, wherein input ports and the output ports have user-configurable widths.

15. A chip according to claim 1, wherein the packet processor, the packet switching fabric, the input ports and/or the output ports are configurable via at least one of the input ports.

16. A chip according to claim 1, further comprising an auxiliary serial bus interface, and wherein the packet processor, the packet switching fabric, the input ports and/or the output ports are configurable via the auxiliary serial bus interface.

17. An interface circuit for conveying data between a first plurality of circuit cards and a second plurality of circuit cards, the interface circuit comprising:

a plurality of input ports configured to receive packets from respective ones of the first plurality of circuit cards, respective ones of the input ports comprising respective sets of one or more lanes;

a plurality of output ports configured to transmit packets to respective ones of the second plurality of circuit cards, respective ones of the output ports comprising respective sets of one or more lanes;

a packet switching fabric configured to route packets to selected ones of the output ports without payload modification;

a packet processor configured to receive packets, to extract payloads from the received packets, to perform bit-level transformations on the extracted payloads to form new payloads, to construct new packets comprising the new payloads and to route the new packets to selected ones of the output ports; and control circuitry configured to selectively route first packets received at the input ports to the switching fabric and second packets received at the input ports to the packet processor.

18. An interface circuit according to claim 17, wherein the packet processor is configurable to perform signal sample processing operations on received packets.

19. An interface circuit according to claim 18, wherein the signal sample processing operations comprise bit extension, bit truncation, bit reordering and/or bit arithmetic operations.

20. An interface circuit according to claim 18, wherein the signal sample processing operations comprise radio signal sample processing operations.

21. An interface circuit according to claim 17, wherein the input ports, the output ports, the packet processor and/or the switching fabric are user-configurable.

* * * * *